United States Patent
Wellinghoff et al.

(10) Patent No.: US 7,273,567 B1
(45) Date of Patent: *Sep. 25, 2007

(54) ENERGY-ACTIVATED COMPOSITIONS FOR CONTROLLED SUSTAINED RELEASE OF A GAS

(75) Inventors: Stephen T. Wellinghoff, San Antonio, TX (US); Joel J. Kampa, Boerne, TX (US); Michael D. Lelah, Chicago, IL (US); Sumner A. Barenberg, Chicago, IL (US); Peter N. Gray, Chicago, IL (US); Hong Dixon, Helotes, TX (US)

(73) Assignee: MicroActive Corp., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/448,927

(22) Filed: Nov. 24, 1999

(51) Int. Cl.
*C01B 11/06* (2006.01)
*C01B 11/10* (2006.01)
*C01B 17/50* (2006.01)
*A61L 2/20* (2006.01)
*A61L 2/23* (2006.01)

(52) U.S. Cl. .................. 252/187.23; 252/187.21; 252/187.22; 252/187.1; 252/188.1; 252/188.21; 252/187.25; 252/187.24; 252/186.43; 424/405; 424/406; 424/417; 424/604; 424/613; 424/614; 424/635; 422/5; 422/22; 422/24; 422/29; 422/120; 422/121; 422/37

(58) Field of Classification Search ........... 252/186.43, 252/187.23, 187.24, 187.25, 187.21, 187.22; 252/187.1, 186.44, 188.1, 188.21; 149/5, 149/46, 61, 74, 76, 77; 424/405, 408, 417, 424/604, 613, 614, 635, 637, 646, 661, 565, 424/692, 700, 715, 717; 423/419.1, 421, 423/438, 473, 477, 478, 582, 610; 134/1; 422/5, 22, 24, 29, 37, 120, 121

See application file for complete search history.

(56) References Cited

U.S. PATENT DOCUMENTS

| | | | |
|---|---|---|---|
| 3,904,221 A | 9/1975 | Shikl et al. | |
| 4,561,994 A * | 12/1985 | Rubin et al. | 252/187.23 |
| 5,008,096 A * | 4/1991 | Ringo | 423/477 |
| 5,108,649 A * | 4/1992 | Matsumoto et al. | 252/188.28 |
| 5,244,811 A | 9/1993 | Matthews | 436/146 |
| 5,306,440 A * | 4/1994 | Ripley et al. | 252/186.33 |
| 5,330,661 A * | 7/1994 | Okuda et al. | 210/748 |
| 5,340,605 A | 8/1994 | Silver et al. | 427/126.3 |
| 5,360,609 A | 11/1994 | Wellinghoff | 514/772.3 |
| 5,411,643 A | 5/1995 | Cawlfield et al. | 204/115 |
| 5,501,801 A | 3/1996 | Zhang et al. | 210/748 |
| 5,616,532 A | 4/1997 | Heller et al. | 502/242 |
| 5,631,300 A | 5/1997 | Wellinghoff | 514/772.3 |
| 5,639,295 A | 6/1997 | Wellinghoff et al. | 106/15.05 |
| 5,650,446 A | 7/1997 | Wellinghoff et al. | 514/772.3 |
| 5,658,841 A | 8/1997 | Tanaka et al. | 502/305 |

(Continued)

OTHER PUBLICATIONS

Frank, et al. "Semiconductor Electrodes. 12. Photoassisted Oxidations and Photoelectrosynthesis at Polycrystalline $TiO_2$ Electrodes," Journal of the Am. Chemical Society, vol. 99, No. 14, pp. 4667-4675, 1977.

(Continued)

*Primary Examiner*—Joseph D. Anthony
(74) *Attorney, Agent, or Firm*—Senniger Powers

(57) ABSTRACT

A composition for energy-controlled generation and release of at least one gas, which includes an energy-activated catalyst capable of being activated by electromagnetic energy, and a solid or a liquid containing anions capable of being oxidized by the activated catalyst or reacted with species generated during activation of the catalyst to generate at least one gas. The composition, when exposed to electromagnetic energy, is capable of generating and releasing the gas after activation of the catalyst and oxidation or reaction of the anions.

20 Claims, 13 Drawing Sheets

U.S. PATENT DOCUMENTS

| | | | |
|---|---|---|---|
| 5,668,185 A | 9/1997 | Wellinghoff | 514/772.3 |
| 5,695,814 A | 12/1997 | Wellinghoff et al. | 427/213 |
| 5,705,092 A | 1/1998 | Wellinghoff et al. | 252/187.21 |
| 5,707,739 A | 1/1998 | Wellinghoff et al. | 428/403 |
| 5,736,165 A | 4/1998 | Ripley et al. | 424/661 |
| 5,753,106 A * | 5/1998 | Schenck | 210/96.1 |
| 5,772,897 A | 6/1998 | Hancock | 210/756 |
| 5,783,105 A | 7/1998 | Zhang et al. | 252/187.31 |
| 5,849,200 A | 12/1998 | Heller et al. | 210/748 |
| 5,854,169 A | 12/1998 | Heller et al. | 502/242 |
| 5,868,924 A | 2/1999 | Nachtman et al. | 210/85 |
| 5,872,072 A | 2/1999 | Mouri et al. | 502/208 |
| 5,874,701 A | 2/1999 | Watanabe et al. | 204/157.15 |
| 5,880,067 A | 3/1999 | Linkous | 504/151 |
| 5,883,330 A * | 3/1999 | Yoshida | 149/83 |
| 5,888,528 A | 3/1999 | Wellinghoff et al. | 424/405 |
| 5,898,126 A | 4/1999 | Yoshida | 149/46 |
| 5,914,120 A | 6/1999 | Wellinghoff et al. | 424/406 |
| 5,922,776 A | 7/1999 | Wellinghoff et al. | 514/772.3 |
| 5,965,264 A | 10/1999 | Barenberg et al. | 428/402 |
| 5,980,826 A | 11/1999 | Barenberg et al. | 422/37 |
| 6,306,352 B1 * | 10/2001 | Yoshida et al. | 422/120 |

OTHER PUBLICATIONS

Inoue, et al. "Competitive Photosensitized Oxidation at $TiO_2$ Photoanode," Chemistry Letters, , pp. 1073-1076, 1977.

International Search Report in PCT/US00/10804 dated Aug. 24, 2000 (4 pages).

Patent Abstracts of Japan, vol. 012, No. 252 (C-512), Jul. 15, 1988 & JP 63 040705 A (EBARA RES CO LTD), Feb. 22, 1988.

Partial European Search Report for European Patent Application No. EP 00926243.7, dated Mar. 26, 2003, 5 pages.

* cited by examiner

ENERGY-ACTIVATED COMPOSITIONS FOR CONTROLLED SUSTAINED RELEASE OF A GAS

BACKGROUND OF THE INVENTION

The present invention relates generally to a composition which is activated by electromagnetic energy to provide controlled sustained generation and release of at least one gas. The invention particularly relates to a composition including an energy-activated catalyst and anions capable of being oxidized by the activated catalyst surface or subsequent reaction product to generate a gas, for retarding, controlling, killing or preventing microbiological contamination (e.g., bacteria, fungi, viruses, mold spores, algae, and protozoa), deodorizing, enhancing freshness, and/or retarding, preventing, inhibiting, or controlling chemotaxis by release of a gas or a combination of gases, such as chlorine dioxide, sulfur dioxide, nitrogen dioxide, nitric oxide, nitrous oxide, carbon dioxide, hydrogen sulfide, hydrocyanic acid, dichlorine monoxide, chlorine, or ozone.

Photocatalysts are generally used to catalyze oxidation and reduction reactions, such as the degradation of organic compounds which contaminate air or water. When exposed to ultraviolet radiation in the presence of a semiconductor, water, oxygen and hydroxide anions can be converted to peroxide anions and hydroxyl radicals. These species can further react with an organic compound that ultimately forms carbon dioxide and water. Carbon dioxide is generated by the decomposition of organic matter, not by the oxidation of anions.

A photocatalyst increases the production of hydroxyl radicals to catalyze decomposition of the organic compounds. When a photon is absorbed by a semiconductor photocatalyst, an electron is promoted from the valence band to the conduction band, producing a valence band hole. The hole and the electron diffuse to the surface of the photocatalyst particle where each may chemically react. Valence band holes either oxidize organic compounds or oxidize adsorbed water molecules to generate hydroxyl radicals. Examples of such use of photocatalysts include Nachtman et al., U.S. Pat. No. 5,868,924 (reduction of total organic carbon content by passing water through a water purifier chamber containing a photocatalyst); Matthews, U.S. Pat. No. 5,244,811, and Zhang et al., U.S. Pat. No. 5,501,801 (methods for photocatalytic oxidation of organic contaminants in a fluid by contacting the fluid with a photocatalyst-coated surface to decompose the contaminants); Tanaka et al., U.S. Pat. No. 5,658,841 (conversion of organics to carbon dioxide by exposing a liquid to a photocatalyst); Heller et al., U.S. Pat. Nos. 5,616,532, 5,849,200 and 5,854,169 (compositions containing photocatalysts and substantially non-oxidizable binders that are used to remove organic contaminants from air, water or a surface coated with the composition); Watanabe et al., U.S. Pat. No. 5,874,701 (photodecomposition of bacteria or airborne substances that contact a wall or floor coated with a photoactive film); and Mouri et al, U.S. Pat. No. 5,872,072, and Linkous, U.S. Pat. No. 5,880,067 (photocatalysts for deodorizing or decontaminating a surface by decomposing malodors such as ammonia or hydrogen sulfide, or microbial contaminants, such as algae, fungi or bacteria, in air or a liquid that contacts the surface).

Photocatalysts have also been used in electrochemical photocells to generate gases in electrolyte solutions using an electrical current. Inoue et al., "Competitive Photosensitized Oxidation at $TiO_2$ Photoanode," Chemistry Letters, 1073-1076 (1977) describe photoelectrochemical oxidation of halide ions, such as chloride anions, in an electrolyte solution.

Chlorine dioxide and other biocidal gases have also been generated and released through the use of an activator that provides hydronium ions which then react with a precursor to form the gas. Ripley et al., U.S. Pat. No. 5,736,165 describe two component systems including a liquid component containing a chlorine dioxide precursor, such as a metal chlorite, and an activator component, such as a transition metal or acid. The components are separated until use to prevent premature formation of chlorine dioxide. When the components are combined, the hydronium ions react with the chlorine dioxide precursor to form chlorine dioxide.

Compositions that are moisture activated to generate and release chlorine dioxide gas or other gases are described by Wellinghoff et al. in U.S. Pat. Nos. 5,360,609, 5,631,300, 5,639,295, 5,650,446, 5,668,185, 5,695,814, 5,705,092, 5,707,739, and 5,888,528, and copending U.S. patent application Ser. Nos. 08/651,876, 08/724,907, 08/858,860, 08/921,357, 08/924,684, and 09/138,219. These compositions contain anions that react with hydronium ions to generate and release a gas. Such compositions need to be protected from moisture during production, storage and shipment to prevent premature gas generation and release.

There is a need for an inert composition that can be easily activated to initiate generation and release of chlorine dioxide or another gas in use. A composition that, except for the anions therein for generating the gas, is composed of and reacts to provide residues composed of only substances usable in foods, or those generally recognized as safe or inert substances, is particularly needed for food packaging, modified atmosphere packaging, and other applications where the substances can be ingested by or in contact with humans. Although the Wellinghoff et al. moisture-activated compositions are effective biocides and deodorants, there is a need for compositions that are more readily manufactured, easily activated and deactivated to provide more control or flexibility for controlled sustained generation and release of a gas, and easily transported and stored prior to use without the need for avoiding exposure to atmospheric moisture. There is also a need for a composition that can generation and release a gas when completely encapsulated in a hydrophobic material.

SUMMARY OF THE INVENTION

Among the objects of the invention, therefore, may be noted the provision of a composition that generates and releases a concentration of chlorine dioxide or other biocidal gas sufficient to eliminate bacteria, fungi, molds, algae, protozoa and viruses; the provision of a composition that generates and releases a concentration of a gas that retards, prevents, inhibits, or controls biochemical decomposition, controls respiration, retards, prevents, inhibits, or controls chemotaxis, enhances freshness or deodorizes; the provision of such a composition that generates and releases such gas concentrations after photoactivation for a period of up to several months; the provision of such a composition that is easily stored and is unaffected by atmospheric moisture; the provision of such a composition that begins to release a gas under controlled or sustained conditions within seconds, minutes, hours, days, weeks or months after being activated by electromagnetic energy; the provision of such a composition that can be deactivated to suspend gas generation and later reactivated to again generate a gas; the provision of such a composition having greater gas release efficiency compared to known compositions; the provision of such a composition that, except for the anions therein for generating the biocidal gas, only contains substances approved for human exposure; the provision of such a composition that is odorless; the provision of a powder that is free-flowing and can be easily blended with other ingredients prior to application; the provision of a powder that can penetrate porous surfaces; the provision of a process for preparing a composition which requires few reactions or physical processes to provide controlled sustained generation and release of chlorine dioxide or other biocidal gases; the provision of such a process which allows for elevated temperature processing and application of the composition without thermal decomposition thereof; the provision of such a process which utilizes relatively inexpensive starting materials to minimize applications cost; and the provision of such a process which reduces manufacturing hazards and disposal requirements as compared to most conventional processes for preparing chlorine dioxide releasing compositions.

The present invention is directed to a composition for electromagnetic energy-controlled generation and release of at least one gas, which includes an energy-activated catalyst capable of being activated by electromagnetic energy, and a solid or a solids-containing suspension containing anions capable of being oxidized or reacted to generate at least one gas. The composition, when exposed to electromagnetic energy, is capable of generating and releasing the gas after activation of the catalyst and oxidation or reaction of the anions.

Another embodiment of the invention is directed to a composition for electromagnetic energy-controlled generation and release of at least one gas, which includes an energy-activated catalyst capable of being activated by electromagnetic energy, and anions capable of being oxidized or reacted to generate at least one gas selected from the group consisting of chlorine dioxide, sulfur dioxide, hydrogen sulfide, dichlorine monoxide, hydrocyanic acid, nitrogen dioxide and nitric oxide. The composition, when exposed to electromagnetic energy, is capable of generating and releasing the gas after activation of the catalyst and oxidation or reaction of the anions. Preferably, the anions are chlorite anions.

The present invention is also directed to a powder for controlled sustained generation and release of at least one gas, wherein the powder includes a core containing an energy-activated catalyst capable of being activated by electromagnetic energy, and particles or a layer on a surface of the core. The particles or the layer contain anions capable of being oxidized or reacted to generate at least one gas. The powder, when exposed to electromagnetic energy, is capable of generating and releasing the gas after activation of the catalyst and oxidation or reaction of the anions. Preferably, the particles or the layer contains chlorite anions.

The powder is prepared by a process including the steps of admixing an energy-activated catalyst and particles containing anions that are capable of being oxidized or reacted to generate at least one gas with a solvent to form a suspension, and forming a powder from the suspension. The powder, when exposed to electromagnetic energy, is capable of generating and releasing the gas after activation of the catalyst and oxidation or reaction of the anions.

Another aspect of the invention is directed to a method for providing controlled generation and release of at least one gas by providing a solid or a solids-containing suspension containing an energy-activated catalyst and anions capable of being oxidized or reacted to generate at least one gas, and exposing the solid or the solids-containing suspension to electromagnetic energy to activate the catalyst and oxidize or react the anions to generate and release the gas.

The invention is also directed to a method of retarding, killing, preventing or controlling microbiological contamination on a surface of a material, within the material or in the atmosphere surrounding the material, by placing a material adjacent to a composition that does not generate and release a biocidal gas in the absence of electromagnetic energy, and exposing the composition to electromagnetic energy to generate and release at least one biocidal gas from the composition into the atmosphere surrounding the material.

Another embodiment of the invention is directed to a method of retarding, preventing, inhibiting or controlling biochemical decomposition on a surface of a material or within the material by placing the material adjacent to a composition that does not generate and release a biochemical decomposition-inhibiting gas in the absence of electromagnetic energy, and exposing the composition to electromagnetic energy to generate and release at least one biochemical decomposition-inhibiting gas from the composition into the atmosphere surrounding the material.

Yet another embodiment of the invention is a method of controlling respiration of a material by placing the material adjacent to a composition that does not generate and release a respiration-controlling gas in the absence of electromagnetic energy, and exposing the composition to electromagnetic energy to generate and release at least one respiration-controlling gas from the composition into the atmosphere surrounding the material.

The invention is also directed to a method of deodorizing a surface of a material or the atmosphere surrounding the material or enhancing freshness of the material, by placing a material adjacent to a composition that does not generate and release a deodorizing gas in the absence of electromagnetic energy, and exposing the composition to electromagnetic energy to generate and release at least one deodorizing gas from the composition into the atmosphere surrounding the material.

Another embodiment of the invention is directed to method of retarding, preventing, inhibiting, or controlling chemotactic attraction of an organism to a material, by placing a material adjacent to a composition that does not generate and release an odor-masking gas or an odor-neutralizing gas in the absence of electromagnetic energy, and exposing the composition to electromagnetic energy to generate and release at least one odor-masking gas or odor-neutralizing gas from the composition into the atmosphere surrounding the material.

The invention is also directed to a method of retarding, preventing or controlling biological contamination of an atmosphere by exposing the composition to electromagnetic energy to generate and release at least one decontaminating gas from the composition into the atmosphere surrounding the composition.

Yet another embodiment of the invention is directed to a method of retarding, killing, preventing, or controlling microbiological contamination, or retarding, preventing, inhibiting or controlling biochemical decomposition on a surface of a material, within the material or in the atmosphere surrounding the material, deodorizing a surface of a material or the atmosphere surrounding the material, enhancing freshness of the material, or retarding, preventing, inhibiting, or controlling chemotactic attraction of an organism to a material, by placing a material adjacent to a composition that does not generate and release chlorine dioxide gas in the absence of electromagnetic energy, and exposing the composition to electromagnetic energy to generate and release chlorine dioxide gas from the composition into the atmosphere surrounding the material.

Another embodiment of the invention is directed to a composite for electromagnetic energy-controlled generation and release of at least one gas, including a gas-generating layer and a barrier layer. The gas-generating layer includes an energy-activated catalyst capable of being activated by electromagnetic energy and anions capable of being oxidized or reacted to generate at least one gas. The barrier layer is adjacent to a surface of the gas generating layer, is capable of transmitting electromagnetic energy to the gas generating layer and is impermeable or semipermeable to the gas. The gas generating layer, when exposed to electromagnetic energy is capable of generating and releasing the gas after activation of the catalyst and oxidation or reaction of the anions.

Another embodiment of the invention is directed to a composition for electromagnetic energy-controlled and moisture-controlled generation and release of at least one gas. The composition includes an energy-activated catalyst capable of being activated by electromagnetic energy; anions capable of reacting with a protic species generated during activation of the catalyst or oxidizing to generate at least one gas; an acid releasing agent; and anions capable of reacting with hydronium ions to generate at least one gas. The composition, when exposed to electromagnetic energy and moisture, is capable of generating and releasing the gas after activation of the catalyst, hydrolysis of the acid releasing agent, and oxidation or reaction of the anions.

Other objects and advantages of the invention will be apparent from the following detailed description.

DETAILED DESCRIPTION OF THE PREFERRED EMBODIMENTS

Figure 1A:
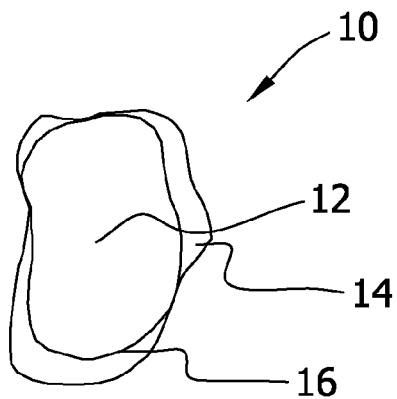
FIGS. 1a-1c are schematics of a particle for providing controlled sustained generation and release of a gas.

In accordance with the present invention, it has been discovered that controlled sustained release of a gas such as chlorine dioxide can be generated from a composition containing an energy-activated catalyst and anions when the composition is exposed to electromagnetic energy such as visible or ultraviolet light. The anions are either oxidized by the activated catalyst or reacted with species generated during activation of the catalyst to generate the gas. The generation of gas can be suspended by stopping exposure of the composition to electromagnetic energy, and resumed by again exposing the composition to electromagnetic energy. The composition can be repeatedly activated and deactivated in this manner as needed for a desired use. Unlike moisture-activated materials that generate hydronium ions, the energy-activated composition can be processed at high pH preventing decomposition of the anions used to generate the gas. The composition preferably includes a photoactive catalyst so that the anions are photo-oxidized. The composition is preferably formulated as a powder which is easily prepared and can be used as is or incorporated into various end-use products, such as films, adhesives, granular blends, waxes, resins, polymers, plastics, powdered compositions and formed objects such as tablets and tubing. The powder can also be composed entirely of inorganic materials so that it is odorless.

The composition of the invention preferably comprises between about 50 wt. % and about 99.99 wt. % of an energy-activated catalyst capable of being activated by electromagnetic energy, and between about 0.01 wt. % and about 50 wt. % of a source of anions capable of being oxidized by the activated catalyst or reacted with species generated during activation of the catalyst to generate a gas, and more preferably, between about 80 wt. % and about 98 wt. % of the energy-activated catalyst and between about 2 wt. % and about 20 wt. % of the anion source, and most preferably, between about 86 wt. % and about 96 wt. % of the energy-activated catalyst and between about 4 wt. % and about 14 wt. % of the anion source. When the composition is exposed to electromagnetic energy, the energy-activated catalyst is activated and the anions are oxidized or reacted to generate and release the gas.

Without being bound by a particular theory of the invention, it is believed that the composition generates a gas via one or more of the following mechanisms. When exposed to electromagnetic energy, the energy-activated catalyst absorbs a photon having energy in excess of the band gap. An electron is promoted from the valence band to the conduction band, producing a valence band hole. The valence band hole and electron diffuse to the surface of the energy-activated catalyst where each can chemically react. An anion is oxidized by the activated catalyst surface when an electron is transferred from the anion to a valence band hole, forming the gas. It is believed that chlorine dioxide or nitrogen dioxide are generated by such transfer of an electron from a chlorite or nitrite anion to a valance band hole. It is believed that these and other gases, such as ozone, chlorine, carbon dioxide, nitric oxide, sulfur dioxide, nitrous oxide, hydrogen sulfide, hydrocyanic acid, and dichlorine monoxide, can also be formed via reaction of an anion with protic species generated during activation of the catalyst by abstraction of an electron from water, chemisorbed hydroxyl, or some other hydrated species. The gas diffuses out of the composition into the surrounding atmosphere for a period of up to about six months to affect materials situated near the composition. Compositions that release several parts per million of gas per cubic centimeter per day for a period of at least one day, one week, one month or six months can be formulated by the processes of the present invention for a variety of end uses, including deodorization, freshness enhancement, control, delay or prevention of chemotaxis such as reduction or inhibition of insect infestation, control, reduction, inhibition or prevention of biochemical decomposition, respiration control, and control, delay, destruction or prevention of the growth of microorganisms such as bacteria, molds, fungi, algae, protozoa, and viruses on materials. Although the compositions generally provide controlled sustained release of a gas, the compositions can be formulated so that gas is released during less than one day if desired for a particular end use.

The composition can be a solid, such as a powder, film, tablet, or coating, or a liquid such as a solids-containing suspension (e.g., dispersion, emulsion) depending upon the intended use of the composition. In a preferred embodiment, the composition is a powder as shown in FIG. 1 comprised of a plurality of particles 10 including a core 12 having a layer 14 on an outer surface 16 of the core. Alternatively, the composition is a powder as shown in FIG. 1b comprised of a plurality of particles 18 including the core 12 having particles 20 on the outer surface 16 of the core. In another preferred embodiment, the composition is a powder as shown in FIG. 1c comprised of a plurality of particles 22 including the core 12 having the layer 14 and the particles 20 on the outer surface 16 of the core. The core 12 comprises an energy-activated catalyst. The layer 14 and the particles 20 include anions capable of being oxidized by the activated catalyst or reacted with species generated during activation of the catalyst to generate a gas. Although the layer 14 is preferably continuous and substantially uniform, a particle 10 or 22 having a discontinuous layer 14 of variable thickness provides acceptable, sustained release of a gas. The powders preferably are about 50 Angstroms to about 1 millimeter in size.

A powder of the invention preferably comprises between about 50 wt. % and about 99.99 wt. % of the energy-activated catalyst, and between about 0.01 wt. % and about 50 wt. % of a source of anions capable of being oxidized by the activated catalyst or reacted with species generated during activation of the catalyst to generate a gas, and more preferably, between about 80 wt. % and about 98 wt. % of the energy-activated catalyst and between about 2 wt. % and about 20 wt. % of the anion source, and most preferably, between about 86 wt. % and about 96 wt. % of the energy-activated catalyst and between about 4 wt. % and about 14 wt. % of the anion source. When the powder is exposed to electromagnetic energy, the energy-activated catalyst core is activated and the anions on the surface of the core are oxidized or reacted to generate and release the gas.

When a suspension is exposed to electromagnetic energy, the energy-activated catalyst is activated, the anions are oxidized or reacted with species generated during excitation of the catalyst to generate the gas, and the gas diffuses through the suspension and is released.

Any source containing anions that are capable of being oxidized by the activated catalyst or reacted with species generated during excitation of the catalyst to generate a gas can be used in the composition. An anion is capable of being oxidized by the activated catalyst to generate a gas if its oxidation potential is such that it will transfer an electron to a valence band hole of the energy-activated catalyst. Preferably, a solid contains the anions. Suitable solids include a salt of the anion and a counterion; an inert material such as a sulfate, a zeolite, or a clay impregnated with the anions; a polyelectrolyte such as polyethylene glycol, an ethylene oxide copolymer, or a surfactant; a solid electrolyte or ionomer such as nylon or Nafion™ (DuPont); or a solid solution. When the composition is a solids-containing suspension, a salt dissociates in a solvent to form a solution including anions and counterions, and the energy-activated catalyst is suspended in the solution. A powder can be formed, for example, by drying this suspension or by physically blending the solid (e.g., salt particles) with the energy-activated catalyst particles.

Suitable salts for use as the anion source include an alkali metal chlorite, an alkaline-earth metal chlorite, a chlorite salt of a transition metal ion, a protonated primary, secondary or tertiary amine, or a quaternary amine, an alkali metal bisulfite, an alkaline-earth metal bisulfite, a bisulfite salt of a transition metal ion, a protonated primary, secondary or tertiary amine, or a quaternary amine, an alkali metal sulfite, an alkaline-earth metal sulfite, a sulfite salt of a transition metal ion, a protonated primary, secondary or tertiary amine, or a quaternary amine, an alkali metal sulfide, an alkaline-earth metal sulfide, a sulfide salt of a transition metal ion, a protonated primary, secondary or tertiary amine, or a quaternary amine, an alkali metal bicarbonate, an alkaline-earth metal bicarbonate, a bicarbonate salt of a transition metal ion, a protonated primary, secondary or tertiary amine, or a quaternary amine, an alkali metal carbonate, an alkaline-earth metal carbonate, a carbonate salt of a transition metal ion, a protonated primary, secondary or tertiary amine, or a quaternary amine, an alkali metal hydrosulfide, an alkaline-earth metal hydrosulfide, a hydrosulfide salt of a transition metal ion, a protonated primary, secondary or tertiary amine, or a quaternary amine, an alkali metal nitrite, an alkaline-earth metal nitrite, a nitrite salt of a transition metal ion, a protonated primary, secondary or tertiary amine, or a quaternary amine, an alkali metal hypochlorite, an alkaline-earth metal hypochlorite, a hypochlorite salt of a transition metal ion, a protonated primary, secondary or tertiary amine, or a quaternary amine, an alkali metal cyanide, an alkaline-earth metal cyanide, a cyanide salt of a transition metal ion, a protonated primary, secondary or tertiary amine, or a quaternary amine, an alkali metal peroxide, an alkaline-earth metal peroxide, or a peroxide salt of a transition metal ion, a protonated primary, secondary or tertiary amine, or a quaternary amine. Preferred salts include sodium, potassium, calcium, lithium or ammonium salts of a chlorite, bisulfite, sulfite, sulfide, hydrosulfide, bicarbonate, carbonate, hypochlorite, nitrite, cyanide or peroxide. Commercially available forms of chlorite and other salts suitable for use, can contain additional salts and additives such as tin compounds to catalyze conversion to a gas.

The gas released by the composition will depend upon the anions that are oxidized or reacted. Any gas formed by the loss of an electron from an anion, by reaction of an anion with electromagnetic energy-generated protic species, by reduction of a cation in an oxidation/reduction reaction, or by reaction of an anion with a chemisorbed molecular oxygen, oxide or hydroxyl radical can be generated and released by the composition. The gas is preferably chlorine dioxide, sulfur dioxide, hydrogen sulfide, hydrocyanic acid, nitrogen dioxide, nitric oxide, nitrous oxide, carbon dioxide, dichlorine monoxide, chlorine or ozone.

Chlorine dioxide gas is generated and released if the composition contains a source of chlorite anions. Suitable chlorite sources that can be incorporated into the composition include alkali metal chlorites such as sodium chlorite or potassium chlorite, alkaline-earth metal chlorites such as calcium chlorite, or chlorite salts of a transition metal ion, a protonated primary, secondary or tertiary amine, or a quaternary amine such as ammonium chlorite, trialkylammonium chlorite, and quaternary ammonium chlorite. Suitable chlorite sources, such as sodium chlorite, are stable at processing temperatures in excess of about 90° C. when incorporated in the compositions of the present invention, allowing for processing at relatively high temperatures. Chlorine dioxide-releasing compositions can be used to deodorize, enhance freshness, retard, prevent, inhibit, or control chemotaxis, retard, prevent, inhibit, or control biochemical decomposition, retard, prevent or control biological contamination (e.g., deactivate biological contaminants following biological warfare), or to kill, retard, control or prevent the growth of bacteria, molds, fungi, algae, protozoa, and viruses.

Sulfur dioxide is generated and released if the composition contains bisulfite or sulfite anions. Bisulfite sources that can be incorporated into the composition include alkali metal bisulfites such as sodium bisulfite or potassium bisulfite, alkaline-earth metal bisulfites such as calcium bisulfite, or bisulfite salts of a transition metal ion, a protonated primary, secondary or tertiary amine, or a quaternary amine. Such bisulfite salts dissociate in solution to form bisulfite anions and possibly sulfite anions. Sulfur dioxide gas-releasing compositions can be used for food preservation (e.g. to inhibit biochemical decomposition such as browning of produce), disinfection, and inhibition of enzyme-catalyzed reactions. The compositions can also be used for reduction of chlorine gas concentration in catalytic cycles where aluminum or iron powder is used to selectively scrub chlorine from a mixture of chlorine and chlorine dioxide. The compositions are also useful in modified atmosphere packaging by placing the composition within a package, exposing the composition to electromagnetic energy to generate sulfur dioxide, and sealing the package to create a sulfur dioxide atmosphere within the package.

Hydrogen sulfide is generated and released from a composition containing hydrosulfide or sulfide anions. Acceptable sources of hydrosulfide anions include alkali metal hydrosulfides such as sodium hydrosulfide or potassium hydrosulfide, alkaline-earth metal hydrosulfides such as calcium hydrosulfide, or hydrosulfide salts of a transition metal ion, a protonated primary, secondary or tertiary amine, or a quaternary amine. Acceptable sources of sulfide anions include alkali metal sulfides such as sodium sulfide or potassium sulfide, alkaline-earth metal sulfides such as calcium sulfide, or sulfide salts of a transition metal ion, a protonated primary, secondary or tertiary amine, or a quaternary amine. Hydrogen sulfide gas-releasing compositions can be used as a reducing agent or a sulfur source in the manufacture of chemicals, and as a polymerization inhibitor.

Chlorine gas and dichlorine monoxide are generated and released from a composition containing hypochlorite anions. Acceptable sources of hypochlorite anions include alkali metal hypochlorites such as sodium hypochlorite, alkaline-earth metal hypochlorites such as calcium hypochlorite, or hypochlorite salts of a transition metal ion, a protonated primary, secondary or tertiary amine, or a quaternary amine. Chlorine gas-releasing compositions can be used in processing meat, fish and produce and as an insecticide. Dichlorine monoxide releasing compositions can be used as a biocide.

Hydrocyanic acid is generated and released from a composition if it contains a source of cyanide anions. Suitable sources of cyanide anions include alkali metal cyanides such as sodium cyanide or potassium cyanide, alkaline-earth metal cyanides such as calcium cyanide, or cyanide salts of a transition metal ion, a protonated primary, secondary or tertiary amine, or a quaternary amine. Hydrocyanic acid gas-releasing compositions can be used as a pesticide or a rodenticide.

Carbon dioxide gas is generated and released if a composition contains a source of bicarbonate or carbonate anions. Suitable bicarbonate sources that can be incorporated into the composition include alkali metal bicarbonates such as sodium bicarbonate, potassium bicarbonate, or lithium bicarbonate, alkaline-earth metal bicarbonates, or bicarbonate salts of a transition metal ion, a protonated primary, secondary or tertiary amine, or a quaternary amine such as ammonium bicarbonate. Such bicarbonate salts may dissociate in solution to form bicarbonate anions and possibly carbonate anions. Carbon dioxide gas-releasing compositions can be used in greenhouses by applying it to the soil surface to enrich the air surrounding plants. The carbon dioxide-releasing compositions can also be used in modified atmosphere packaging by placing the composition within a package, exposing the composition to electromagnetic energy to generate carbon dioxide, and sealing the package to create a carbon dioxide atmosphere within the package. The package can then be used to control respiration of produce, cut flowers or other plants during storage and transportation, or to retard, prevent, inhibit or control biochemical decomposition of foods.

A nitrogen oxide such as nitrogen dioxide or nitric oxide is generated and released from a composition if it contains a source of nitrite anions. Suitable sources of nitrite anions include alkali metal nitrites such as sodium nitrite or potassium nitrite, alkaline-earth metal nitrites such as calcium nitrite, or nitrite salts of a transition metal ion, a protonated primary, secondary or tertiary amine, or a quaternary amine. Nitrogen dioxide or nitric oxide gas-releasing powders can be used to improve biocompatibility of biomaterials and for modified atmosphere packaging.

Ozone gas is generated and released if the composition contains a source of peroxide anions. Suitable ozone sources that can be incorporated into the composition include alkali metal peroxides such as sodium peroxide or potassium peroxide, alkaline-earth metal chlorites such as calcium peroxide, or peroxide salts of a transition metal ion, a protonated primary, secondary or tertiary amine, or a quaternary amine. Ozone-releasing compositions can be used to deodorize, enhance freshness, retard, prevent, inhibit, or control chemotaxis, retard, prevent, inhibit or control biochemical decomposition, or to kill, retard, control or prevent the growth of bacteria, molds, fungi, algae, protozoa, and viruses.

In some instances, compositions contain two or more different anions to release two or more different gases at different rates. The gases are released for different purposes, or so that one gas will enhance the effect of the other gas. For example, a composition containing bisulfite and chlorite anions may release sulfur dioxide for food preservation and chlorine dioxide for deodorization, freshness enhancement, control of chemotaxis, or control of microorganisms.

Any electromagnetic energy source capable of activating an energy-activated catalyst of the invention can be used to generate a gas from the composition. In other words, any electromagnetic energy source that provides a photon having energy in excess of the band gap of the energy-activated catalyst is suitable. Preferred electromagnetic energy sources include light, such as sunlight, fluorescent light, and ultraviolet light, for photo-activation of the composition. Ultraviolet light and visible light other than incandescent light, such as blue light, are preferred sources of electromagnetic energy. Additives such as UV blockers can also be included in the composition if it is desirable to limit the wavelength range transmitted to the energy-activated catalyst. Photosensitizers can be added to shift the absorption wavelength of the composition, particularly to shift an ultraviolet absorption wavelength to a visible absorption wavelength to improve activation by room lighting. UV absorbers can be added to the composition to slow the gas generation and release rate.

Any semiconductor activated by electromagnetic energy, or a particle or other material incorporating such a semiconductor, can be used as the energy-activated catalyst of the composition. Such semiconductors are generally metallic, ceramic, inorganic, or polymeric materials prepared by various processes known in the art, such as sintering. The semiconductors can also be surface treated or encapsulated with materials such as silica or alumina to improve durability, dispersibility or other characteristics of the semiconductor. Catalysts for use in the invention are commercially available in a wide range of particle sizes from nanoparticles to granules. Representative energy-activated catalysts include metal oxides such as anatase, rutile or amorphous titanium dioxide ($TiO_2$), zinc oxide (ZnO), tungsten trioxide ($Wo_3$), ruthenium dioxide ($RuO_2$), iridium dioxide ($IrO_2$), tin dioxide ($SnO_2$), strontium titanate ($SrTiO_3$), barium titanate ($BaTiO_3$), tantalum oxide ($Ta_2O_5$), calcium titanate ($CaTiO_3$), iron (III) oxide ($Fe_2O_3$), molybdenum trioxide ($MoO_3$), niobium pentoxide ($NbO_5$), indium trioxide ($In_2O_3$), cadmium oxide (CdO), hafnium oxide ($HfO_2$), zirconium oxide ($ZrO_2$), manganese dioxide ($MnO_2$), copper oxide ($Cu_2O$), vanadium pentoxide ($V_2O_5$), chromium trioxide ($CrO_3$), yttrium trioxide ($YO_3$), silver oxide ($Ag_2O$), or $Ti_xZr_{1-x}O_2$ wherein x is between 0 and 1; metal sulfides such as cadmium sulfide (CdS), zinc sulfide (ZnS), indium sulfide ($In_2S_3$), copper sulfide ($Cu_2S$), tungsten disulfide ($WS_2$), bismuth trisulfide ($BiS_3$), or zinc cadmium disulfide ($ZnCdS_2$); metal chalcogenites such as zinc selenide (ZnSe), cadmium selenide (CdSe), indium selenide ($In_2Se_3$), tungsten selenide ($WSe_3$), or cadmium telluride (CdTe); metal phosphides such as indium phosphide (InP); metal arsenides such as gallium arsenide (GaAs); nonmetallic semiconductors such as silicon (Si), silicon carbide (SiC), diamond, germanium (Ge), germanium dioxide ($GeO_2$) and germanium telluride (GeTe); photoactive homopolyanions such as $W_{10}O_{32}^{-4}$; photoactive heteropolyions such as $XM_{12}O_{40}^{-n}$ or $X_2M_{18}O_{62}^{-7}$ wherein x is Bi, Si, Ge, P or As, M is Mo or W, and n is an integer from 1 to 12; and polymeric semiconductors such as polyacetylene. Transition metal oxides such as titanium dioxide and zinc oxide are preferred because they are chemically stable, non-toxic, inexpensive, exhibit high photocatalytic activity, and are available as nanoparticles useful in preparing transparent formed or extruded plastic products.

The rate of gas release from any composition of the invention, activation of the composition to initiate gas release, and the release rate profile can be altered in various ways, such as by changing the concentration of energy-activated catalyst or anion source in the composition, adding a base, surfactant, diluent, or light filtering additive to the composition, adding materials such as silicates to complex active surface sites, introducing charge, lattice or surface defects in the catalyst (e.g., $Ti^{3+}$ impurities in titanium based catalysts), changing the method of processing the composition, modulating light wavelength and intensity, or changing the order of addition of ingredients in preparing the composition.

Up to about 99% of any conventional powder, film, coating or catalytic additive based upon the total weight of the composition can be included in the compositions of the invention. Such additives include colorants and dyes, fragrances, fillers, lubricants, stabilizers, accelerators, retarders, enhancers, blending facilitators, controlled release agents, antioxidants, UV blockers, mold release agents, plasticizers, biocides, flow agents, anti-caking agents, processing aids, and light filtering agents.

Preferable additives for controlling gas release include bases, surfactants and light filtering agents. A base is believed to stabilize anions during processing and participate in the electron transfer by producing hydroxyl radicals which aid in oxidation of the anions. The amount of base within the composition can be adjusted to alter the time period of gas release and enhance the thermal stability of the composition. For example, the concentration of the base can be increased if a longer delay of gas release is desired. Up to about 50 wt. % of a base based upon the total weight of the composition is preferably included in a composition of the invention. Suitable bases include, but are not limited to, an alkali metal hydroxide such as lithium, sodium or potassium hydroxide, an alkaline-earth metal hydroxide such as calcium or magnesium hydroxide, a hydroxide salt of a transition metal ion, a protonated primary, secondary or tertiary amine, or a quaternary amine such as ammonium hydroxide.

A surfactant is believed to create a mobile ion layer on a surface of the composition to speed charge transfer between the anions and valence band holes. Any surfactant that alters the gas release rate can be added to the composition. Representative surfactants include Triton X-301® (an ethoxylated alkylphenol sulfate salt manufactured by Union Carbide) and Triton X-100® (an alkyl aryl ethoxylate manufactured by Union Carbide).

Light filtering additives can control the transfer of incident light into the composition to decrease the gas release rate. Suitable light filtering additives include silicates and clays. Any silicate that is soluble in water or a water solution of a water miscible organic material can be used in preparing the compositions of the invention. Suitable silicates include sodium silicate, sodium metasilicate, sodium sesquisilicate, sodium orthosilicate, borosilicates and aluminosilicates. Commercially available forms of such silicates suitable for use generally include sodium and potassium cations. The ratio of silicon measured as $SiO_2$ to alkali metal cation measured as $M_2O$ in the silicate particles, wherein M is selected from the group consisting of sodium and potassium, is between about 2.0 and about 4.0, preferably between about 2.3 and about 3.5, most preferably between about 2.5 and about 3.2.

The compositions of the present invention can be made in a variety of forms including powders, films, coatings, tablets, emulsions, and suspensions. A suspension is preferably prepared by admixing an energy-activated catalyst, a solvent, and a chlorite, bisulfite, sulfite, sulfide, bicarbonate, carbonate, hydrosulfide, nitrite, hypochlorite, or cyanide salt. Preferably, the salt is mixed with the solvent to form a solution and the energy-activated catalyst is admixed with the solution to form the suspension. The suspension is stored under conditions where it is not exposed to electromagnetic energy of a wavelength that would activate the catalyst (e.g., in dark conditions for photoactive catalysts). Alternatively, the energy-activated catalyst and solvent can be admixed to form a slurry and the salt can be added to the slurry to form the suspension, or both the energy-activated catalyst and the salt can be mixed with a solvent before they are admixed to form the suspension.

When preparing the suspension, ultrasonic mixing, high-shear mixing, or any conventional homogenizing method can be used. The solvent used to form the suspension is any liquid in which the salt is soluble, such as water or a water solution of a water miscible organic material such as an alcohol, ketone (e.g., acetone), polyacrylate (e.g., poly(methylmethacrylate)), or amide (e.g., dimethylformamide).

Figure 1B:
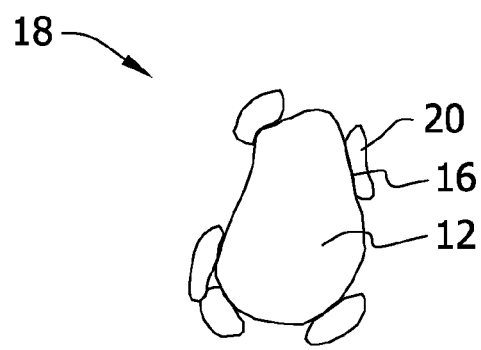
Figure 1C:
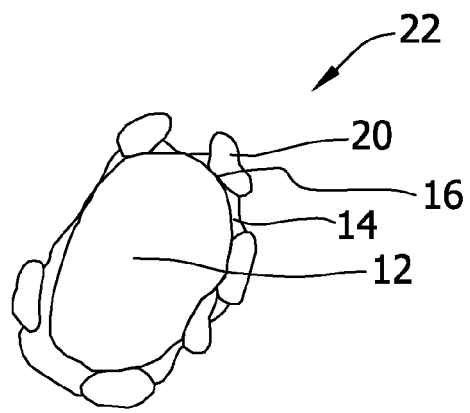

A powder as shown in FIGS. 1a-1c is preferably prepared by spray drying the suspension. Other solvent removal techniques can also be used to form the powder, including filtration, centrifugation, drying the suspension such that the salt is chemisorbed by the energy-activated catalyst particles, or any other solid-liquid separation process. Gas release efficiencies of 50 to 95% are typical of the powders of the invention. The powders are stored under conditions where they are not exposed to electromagnetic energy of a wavelength that would activate the catalyst (e.g., in dark conditions for photoactive catalysts).

Once the suspension is formed, it can be spray dried to form a powder by any method known in the art including, for example, any known atomization methods such as nozzles or rotary discs. Typically, the inlet temperature and outlet temperature are maintained at about 250 to about 350° C.

and about 100 to about 150° C., respectively for an aqueous suspension, and will vary as known in the art for suspensions containing other solvents. The spray drying process generally occurs rapidly (e.g., within up to about 60 seconds). If desired, the powder may then be further dried by any conventional method.

The morphology of any of the powders of the invention can be altered by changing the particle size, solids concentration or relative ratio of components, viscosity, surface tension or temperature of the feed solution, the feed rate, residence time, air flow rate, air temperature, flow direction in the dryer, or the type of nozzle or atomizer used in the spray drying process as is known in the art. For example, the powder of FIG. 1b is formed when the anion concentration is sufficiently high for the anions to crystallize on the surface of the core. At relatively low anion concentrations, the powder of FIG. 1a is formed. The powder of FIG. 1c is formed at intermediate anion concentrations at which the anions co-crystallize on the core surface.

The powders of the invention can be prepared by the methods described above or by any conventional coating process, such as fluidization. In a fluidization method, the salt solution is aerosolized by passing the material through small diameter nozzles into the chamber of the fluidized bed where it can impinge upon the fluidized energy-activated catalyst core particles. Upon contact with the fluidized energy-activated catalyst core particles, the powder is formed as the salt solution evaporates. The powder can then be packaged in a container that blocks electromagnetic energy of a wavelength capable of activating the energy-activated catalyst. The powder can also be ground or micronized to reduce its particle size and form a finer powder before being packaged. The powders of the invention can also be prepared using mechanical blending of salt particles and energy-activated catalyst particles as described in Examples 1 and 3, mechanical-fluidized blending and other known powder preparation methods.

Applications for the compositions are numerous. The compositions can be used in most any environment where exposure to electromagnetic energy can occur. The powders can be formed into solids by molding or sintering. The powders can also be impregnated, melt processed, sintered, blended with other powders, or otherwise incorporated into a variety of materials to provide films, fibers, coatings, tablets, resins, polymers, plastics, tubing, membranes, engineered materials, paints and adhesives for a wide range of end use applications. The powders are particularly useful in preparing any injection-molded products, compression-molded products, thermal-formed products, or extrusion-formed products such as cast or blown films. The thermal stability of the powders allows for their use in injection molding processes.

The powders of the present invention are preferably incorporated into injection-molded, compression-molded, thermal-formed, or extrusion-formed plastic products by compounding and pelletizing the powder via conventional means and admixing the pellets with a material before the conventional forming or molding process. Suitable materials for forming these products include any polymer, multicomponent polymer such as a copolymer, a terpolymer or an oligomer, and polymer alloys or blends thereof or any wax. Representative polymers include polyolefins such as polyethylene and polypropylene, polyethylene terephthalate, polyvinyl chloride, polyurethanes, metallocene polymers, polyesters, polyacrylic esters, acrylic, polystyrene, polycarbonates, polyamides, polyester amides, ethylene-vinyl acetate copolymers, ethylene-methacrylate copolymers, and polyacetals. Suitable waxes include microcrystalline wax, paraffin wax, and synthetic wax such as chlorinated wax, polyethylene wax, polyethylene glycols and polypropylene glycols.

The formed or molded products preferably include between about 0.1 and about 70 wt. % of the powder of the invention and between about 30 and about 99.9 wt. % of the material, and more preferably, between about 1 and about 50 wt. % of the powder of the invention and between about 50 and about 99 wt. % of the material, and most preferably, between about 2 and about 50 wt. % of the powder of the invention and between about 50 and about 98 wt. % of the material.

The formed or molded products can be made by any conventional polymer processing method. For example, a powder or powder pellets of the invention and the material can be mixed together in a mixer, such as a Henschel mixer, and fed to an extruder or molding apparatus operated at a temperature not exceeding about 200° C. to form a melt. The melt can be cast-extruded as a film, formed into pellets using dry air cooling on a vibrating conveyer, or formed into a desired shape by conventional injection-molding, thermal-forming, or compression-molding methods.

The melt can be applied on a surface as a film by using well known hot melt, dip coat, spray coat, curtain coat, dry wax, wet wax, and lamination processes. The manufacture of cast and blown films is described in Examples 10 and 11 below. When the composition of the invention is in nanoparticle form (e.g., 50 Angstrom diameter), a transparent film may be formed.

Conventional film forming additives can be added to the materials as needed. Such additives include crosslinking agents, UV stabilizers, flame retardants, emulsifiers, compatibilizers, lubricants, antioxidants, colorants, and dyes.

A multilayered composite can be formed to generate a gas within an enclosure formed of the composite. Such a composite includes a gas generating layer and a barrier layer. The gas generating layer includes an energy-activated catalyst capable of being activated by electromagnetic energy and anions capable of being oxidized or reacted to generate a gas. The barrier layer is adjacent to a surface of the gas generating layer. The barrier layer is transparent to electromagnetic energy such that it transmits the energy to the gas generating layer. However the barrier layer is impermeable or only semipermeable to the gases generated and released by the gas generating layer. The gas generating layer, when exposed to electromagnetic energy is capable of generating and releasing the gas after activation of the catalyst and oxidation or reaction of the anions.

Gas-releasing powders, suspensions, or other compositions of the invention can be used to retard, kill, prevent or control microbiological contamination on a surface of a material, within the material or in the atmosphere surrounding the material by placing the material adjacent to a composition of the invention, and exposing the composition to electromagnetic energy to release a biocidal gas from the composition into the atmosphere surrounding the material.

Gas-releasing compositions can be used to retard, prevent, inhibit or control biochemical decomposition on a surface of a material or within the material by placing the material adjacent to a composition of the invention, and exposing the composition to electromagnetic energy to generate and release a biochemical decomposition-inhibiting gas from the composition into the atmosphere surrounding the material.

The material is preferably produce such as fruits or vegetables, or other food. The food is preferably stored or transported in modified atmosphere packaging to extend the shelf life of the food by retarding, preventing, inhibiting or controlling biochemical decomposition or microbiological contamination.

The gas-releasing compositions can also be used to control respiration of a material by placing the material adjacent to a composition of the invention, and exposing the composition to electromagnetic energy to generate and release a respiration-controlling gas from the composition into the atmosphere surrounding the material. The material is preferably fruits, vegetables, meats, meat products, seafood, seafood products, or other foods, or flowers or other plants. Control of respiration of foods and flowers is generally accomplished by storing and transporting the food or flowers in modified atmosphere packaging or selective gas permeable packaging.

The gas-releasing compositions can also be used to deodorize a surface of a material or the atmosphere surrounding the material or enhance freshness of the material by placing the material adjacent to the composition, and exposing the composition to electromagnetic energy to generate and release a deodorizing gas from the composition into the atmosphere surrounding the material.

The gas-releasing compositions can also be used to retard, prevent, inhibit, or control chemotactic attraction of an organism to a material by placing the material adjacent to the composition, and exposing the composition to electromagnetic energy to generate and release an odor-masking or odor-neutralizing gas from the composition into the atmosphere surrounding the material.

The gas-releasing compositions can also be used to retard, prevent or control biological contamination of an atmosphere by exposing the composition to electromagnetic energy to generate and release a decontaminating gas from the composition into the atmosphere surrounding the composition. The compositions can also be used to retard, prevent or control biological contamination of a material by placing the material adjacent to the composition, and exposing the composition to electromagnetic energy to generate and release a decontaminating gas from the composition into the atmosphere surrounding the material. The decontaminating gas, for example, is used following biological warfare to deactivate the biological contaminant (e.g., anthrax) or for other military decontamination.

The composition of the invention for use in the above methods is preferably a solid or a liquid such as a solids-containing suspension.

In the above methods, the surface of the material or the entire material can be impregnated with a powder of the invention or coated with the composition, the composition can be admixed with the material, the composition can be enclosed within a gas-permeable container, or the material and the composition can be enclosed within a container. When the composition is enclosed within a container, the container can be hermetically sealed, or partially sealed such that some gas leaks from the container.

The chlorine dioxide-releasing powder, for example, can be impregnated into containers used to store food products, soap, laundry detergent, documents, clothing, paint, seeds, medical instruments, devices and supplies such as catheters and sutures, personal care products, medical or biological waste, athletic shoes, ostomy bags, footwear, and refuse. Such a powder can also be impregnated into covers for medical, hospital, home or commercial equipment or covers used in storage. A packet, sachet bag, "tea bag" or other gas-permeable container of the powder can be included in a storage container to provide a chlorine dioxide microatmosphere upon activation. The chlorine dioxide-releasing powder can also be impregnated into a paper or polymeric material (e.g., a shower mat, shoe inserts or insoles, bandage material, a meat cutting board, a food wrapper, a food packaging tray, a seed packet, or an air filter); incorporated into a wax or polymeric coating applied to paperboard containers or other surfaces; incorporated into films such as packaging films or covers for storage or medical, hospital, home or commercial equipment; formed into porous parts to sterilize water; admixed with a material to create a microatmosphere of chlorine dioxide about the material (e.g., soil); or admixed with other powders to kill microorganisms, enhance freshness or deodorize (e.g., foot powders, bath powders, powders for treating soft surfaces such as carpet powders, desiccants for moisture removal).

The powders can also be admixed with binders or other conventional tabletting materials to form tablets that can be dissolved in water at the point of use to generate and release chlorine dioxide for flower preservation, surface disinfection, sterilization of medical devices, or use as a mouthwash. The suspensions of the invention can also be packaged as ready-to-use products for such end uses.

Suspensions of the invention can be used for the purposes identified above for powders. For example, a suspension as described in Example 12 can be applied to finger nails or toe nails to prevent, reduce, inhibit or control the growth of fungus or whiten the nail, or can be included in nail polish formulations for these purposes. Such suspensions preferably include from about 0.1 to about 50 wt. % of the powder of the invention, from about 20 to about 50 wt. % polymer such as poly(methylmethacrylate) or polyvinyl alcohol, and up to about 79.9 wt. % solvent such as water for water-soluble formulations, or methanol or methylethylketone for non-water-soluble formulations. Suspensions of the invention can also be used in dental applications for localized disinfection in an oral cavity, for example, by applying the composition to a tooth surface before an ultraviolet-cured adhesive is exposed to ultraviolet light to cure the adhesive and form a tooth filling. The ultraviolet light activates the composition to generate and release a disinfecting gas. Compositions of the invention can also be incorporated into a paste for temporary, permanent, or semi-permanent oral care uses.

In addition to deodorization to neutralize malodors, the compositions can be used to retard, prevent, inhibit, or control chemotaxis (i.e., the attraction of a living organism to a chemical substance). For example, odors from food can attract insects to the food. When the food is adjacent to a composition of the invention that releases an odor-masking gas, the odor released from food is indistinct or imperceptible to the insects. The compositions of the invention can also be used to release an odor-neutralizing gas so that the odor released from food is reduced or eliminated and insects are not attracted to the food.

The powders are also especially suitable for use in animal feeds. During preparation and handling, animal feeds for monogastric animals, such as chickens, swine, cats, dogs, rabbits, rats, mice and the like, are often contaminated with bacteria which infect the animal. If the powders of the present invention are formed from edible components, including edible protein coatings, the powders can be incorporated into the animal feed during any stage of production, before transportation or storage of the feed, or before use of the feed so that the chlorine dioxide will reduce or eliminate the bacteria within the feed. The controlled sustained release powders also reduce the bacterial load in the intestines of such monogastric animals.

The compositions of the invention effectively release a gas at temperatures generally encountered in the above uses, including refrigeration temperatures. The chlorine dioxide-releasing compositions, for example, can be used in packaging medical supplies, food or other materials that require refrigeration to sterilize or deodorize the materials. The multilayered films including a barrier layer can also be used to form packaging such as used for medical supplies or food. The barrier layer retains the generated gas within the packaging, for example, to enhance shelf life and prevent mold growth in foods or enhance sterilization of medical supplies.

Compositions of the invention can also be blended with moisture-activated gas-releasing compositions, such as those described by Wellinghoff et al. in U.S. Pat. Nos. 5,360,609, 5,631,300, 5,639,295, 5,650,446, 5,668,185, 5,695,814, 5,705,092, 5,707,739, and 5,888,528, and copending U.S. patent application Ser. Nos. 08/651,876, 08/724,907, 08/858,860, 08/921,357, 08/924,684, and 09/138,219, to provide a moisture and/or energy-activated composition effective for the above uses as well as those known for moisture-activated compositions. A composition for electromagnetic energy-controlled and moisture-controlled generation and release of at least one gas includes an energy-activated catalyst capable of being activated by electromagnetic energy, and at least one anion source. The anions are capable of reacting with a protic species generated during activation of the catalyst or oxidizing to generate at least one gas. The anions also can be capable of reacting with hydronium ions to generate the gas. Alternatively, different anions can be present which are capable of reacting with hydronium ions to generate at least one gas other than that released by the first anion source (i.e., a second anion source). The composition also includes an acid releasing agent as described in the U.S. patents and applications identified above. The acid releasing agent is either an acid, a substance that can be hydrolyzed to an acid (i.e., a substance that reacts with the water that diffuses into the composition to form an acid), or a mixture thereof. The hydronium ions resulting from acid hydrolysis diffuse through the composition and react with anions to generate a gas. When exposed to electromagnetic energy and moisture, the composition is capable of generating and releasing the gas or gasses after activation of the catalyst and oxidation or reaction of the anions. The energy-activated compositions or moisture and energy-activated compositions can also be used in combination with scavengers for gases such as ethylene and oxygen to enhance the control, reduction or prevention of biochemical degradation of foods. Such a composition is described in Example 13.

The following examples are presented to describe preferred embodiments and utilities of the present invention and are not meant to limit the present invention unless otherwise stated in the claims appended hereto.

EXAMPLE 1

Figure 2:
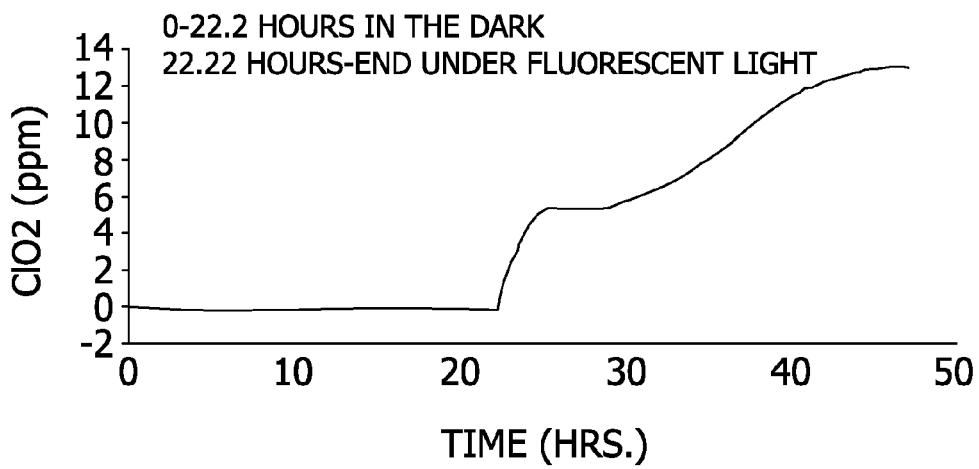
FIGS. 2-11 are plots of gas concentration as a function of time for various powder compositions.

Titanium dioxide (2 g; 99.9% rutile (Aldrich Chemical)) was suspended in water and the pH of the suspension was adjusted to 8.0 using a 0.1 N sodium hydroxide aqueous solution. The suspension was placed on a glass petri dish and evaporated in a dark hood overnight to form a white powder. The powder (1.9015 g) was mixed with sodium chlorite (2.0798 g; technical grade (Aldrich Chemical)), immediately put into a 500 ml jar, and monitored with a 0-10 ppm chlorine dioxide detector. As shown in FIG. 2, no chlorine dioxide was released from the white powder during the initial 22.2 hours of testing when the powder was not exposed to light. However, rapid generation of chlorine dioxide was observed when the powder was exposed to fluorescent visible light.

EXAMPLE 2

Figure 3:
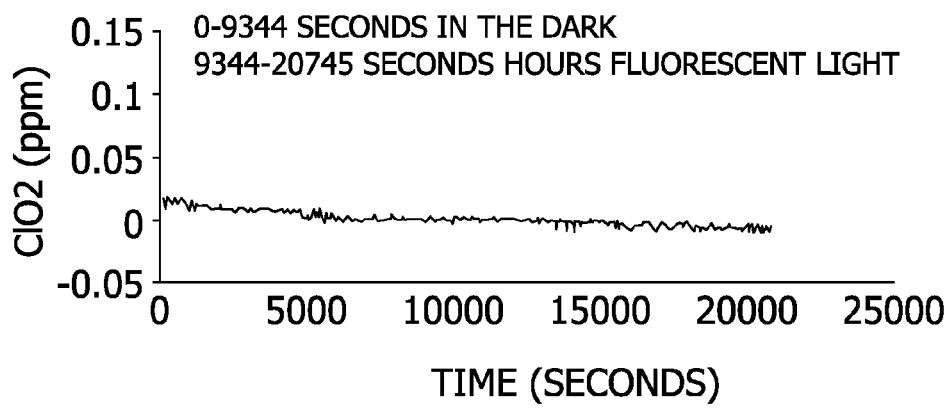

Titanium dioxide (0.5101 g; 99.9% rutile (Aldrich Chemical)) was mixed with sodium chlorite (0.5084 g; technical grade (Aldrich Chemical)) to form a physical powder blend, immediately put into a 500 ml jar, and monitored with a 0-10 ppm chlorine dioxide detector. As shown in FIG. 3, no chlorine dioxide was released from the white powder even after three hours of exposure to fluorescent visible light. As compared to the physical blend of Example 1, this experiment suggests that a physical blend will not generate chlorine dioxide unless surface hydroxyl groups are present.

EXAMPLE 3

Figure 4:
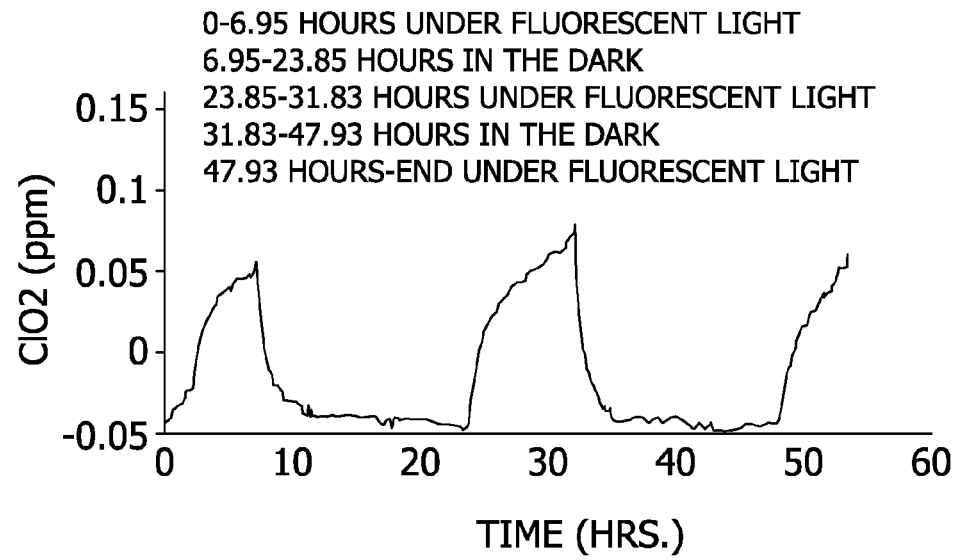

Titanium dioxide (2 g; 99.9% rutile (Aldrich Chemical)) was suspended in water (15 g). The suspension was placed on a glass petri dish and evaporated in a dark hood overnight to form a white powder. The powder (1.9607 g) was mixed with sodium chlorite (2.0157 g; technical grade (Aldrich Chemical)) to form a physical powder blend, immediately put into a 500 ml jar, and monitored with a 0-100 ppm chlorine dioxide detector. As shown in FIG. 4, chlorine dioxide was released from the white powder during the initial 6.95 hours of exposure to fluorescent visible light. Chlorine dioxide release was suspended from 6.95 to 23.85 hours by maintaining the powder in darkness. Chlorine dioxide generation was resumed from 23.85 to 31.83 hours by again exposing the powder to fluorescent visible light. At 31.83 to 47.93 hours, the powder was maintained in darkness again and no chlorine dioxide was generated. Chlorine dioxide gas was generated again at 47.93 hours to the end of the experiment by exposing the powder to fluorescent visible light.

EXAMPLE 4

Figure 5:
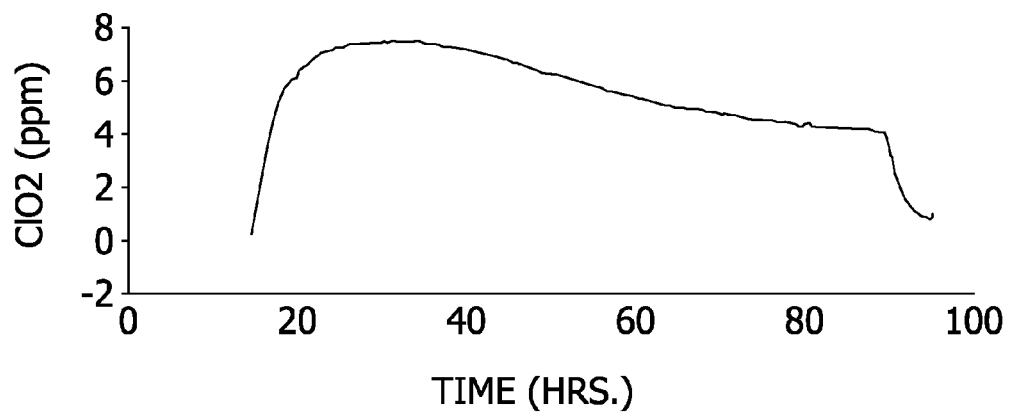

Titanium dioxide (2.0156 g; 99.9% rutile (Aldrich Chemical)) was suspended in water (11 g) and was placed on a glass petri dish. A solution of sodium chlorite (2.0606 g; technical grade (Aldrich Chemical)) and water (7.0411 g) was added and stirred. The resulting suspension had a pH of 10-11. The suspension was evaporated in a dark hood overnight to form a white powder that contained some residual water. The powder was put into a 500 ml jar and monitored with a 0-100 ppm chlorine dioxide detector. As shown in FIG. 5, no chlorine dioxide was released from the white powder during the initial 14.7 hours of testing when the powder was not exposed to light. However, rapid generation of chlorine dioxide was observed under basic conditions from 14.7 to 89.1 hours when the powder was exposed to fluorescent visible light. Chlorine dioxide release rapidly stopped during the period from 89.1 to 94.8 hours when the powder was maintained in the dark, and was resumed at 94.8 to 95 hours when exposure to fluorescent visible light was resumed. A more than four times higher chlorine dioxide gas release level was observed within a ten hour period as compared to the physical powder blend of Example 3 because of more intimate contact of the powder components.

EXAMPLE 5

Figure 6:
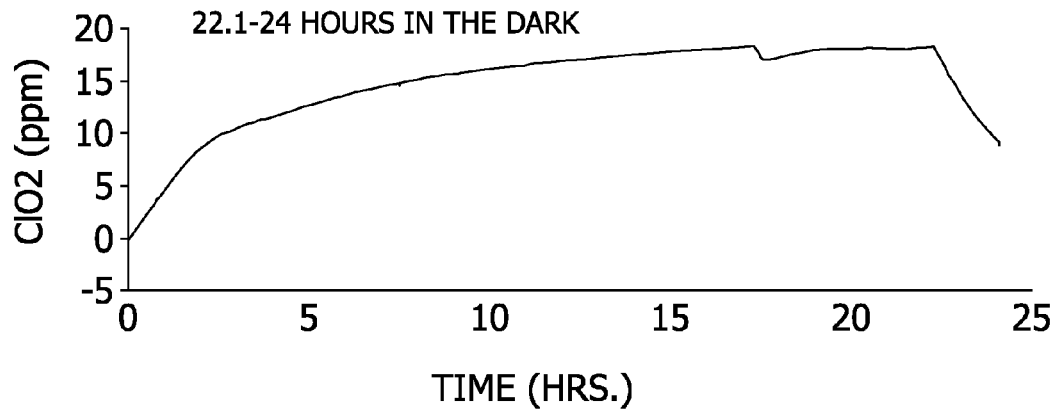

Titanium dioxide (35 g; 99.9% rutile (Aldrich Chemical)) was mixed with a solution of sodium chlorite (35 g; technical grade (Aldrich Chemical)) and water (300 g) to form a suspension and immediately spray dried at an inlet temperature of 200° C. and an outlet temperature of 100° C. under reduced light conditions to form a white powder (36 g). The powder (2 g) was put into a 500 ml jar and monitored with a 0-100 ppm chlorine dioxide electrochemical sensor. As shown in FIG. 6, chlorine dioxide was generated and released from the white powder during the initial 17.2 hours of testing when the powder was exposed to fluorescent visible light. Gas release was suspended from 17.2 to 17.7 hours when the powder was maintained in darkness, resumed from 17.7 to 22.1 hours when the powder was exposed to fluorescent visible light, and suspended again from 22.1 to 24 hours while the powder was maintained in darkness.

EXAMPLE 6

Figure 7:
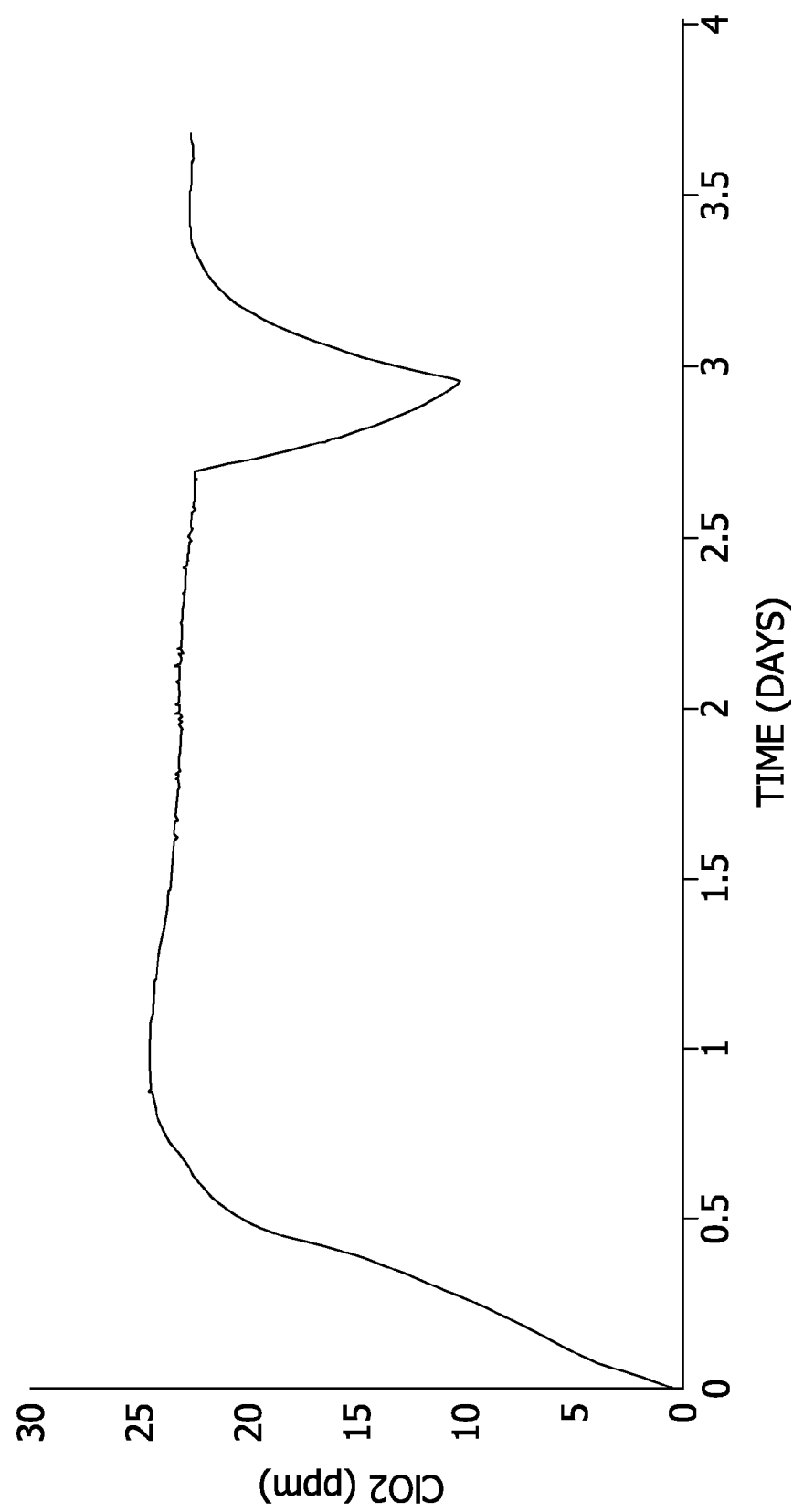

Titanium dioxide (88 g; 99.9% rutile (DuPont R-700)) was suspended in a solution of water (300 g) and sodium hydroxide (2 g) and mixed with sodium chlorite (10 g; technical grade (Aldrich Chemical)) to form a suspension and immediately spray dried at an inlet temperature of 230° C. and an outlet temperature of 120° C. under reduced light conditions to form a white powder. The powder (1 g) was put into a 500 ml jar and monitored with a 0-100 ppm chlorine dioxide electrochemical sensor. As shown in FIG. 7, chlorine dioxide was generated and released from the white powder during the initial 2.75 days of testing when the powder was exposed to fluorescent visible light. Gas release was suspended from 2.75 to 2.95 days when the powder was maintained in darkness, and resumed from 2.95 to 3.65 days when the powder was exposed to fluorescent visible light.

Additional powders were made as described above using the following proportions. Chlorine dioxide was released from all of the powders.

| $NaClO_2$ (g) | NaOH (g) | $TiO_2$ (g) | $TiO_2$ Source |
|---|---|---|---|
| 10 | 0.5 | 89.5 | Aldrich |
| 10 | 1 | 89 | Aldrich |
| 10 | 2 | 88 | Aldrich |
| 10 | 2 | 88 | DuPont R-700[1] |
| 10 | 2 | 88 | DuPont R-700[2] |
| 10 | 2 | 88 | DuPont Ti-Pure ® R-706 |
| 10 | 2 | 88 | Nanophase (Chicago, IL) |
| 10 | 2 | 78 | Aldrich[3] |
| 10 | 5 | 85 | Aldrich |

[1]Suspension was filtered and dried instead of spray-dried
[2]Prepared without aging suspension and by aging 1 or 24 hours
[3]Suspension included 10 g sodium sulfate diluent

EXAMPLE 7

Titanium dioxide (86 g; 99.9% rutile (Aldrich Chemical)) was suspended in a solution of water (300 g), sodium hydroxide (2 g) and Triton X-301® (2 g; from 5 g of a 20% solution) and mixed with sodium chlorite (10 g; technical grade (Aldrich Chemical)) to form a suspension and immediately spray dried at an inlet temperature of 230° C. and an outlet temperature of 120° C. under reduced light conditions to form a white powder. The powder (1 g) was put into a 500 ml jar and monitored with a 0-100 ppm chlorine dioxide electrochemical sensor. Chlorine dioxide was released from the powder.

Powders were also prepared as described above using the following proportions. Note that the suspension included Triton X-100® rather than Triton X-301®. Chlorine dioxide was released from all of the powders.

| $NaClO_2$ (g) | NaOH (g) | Triton X-100 ® (g) | $TiO_2$ (g) | $TiO_2$ Source |
|---|---|---|---|---|
| 10 | 2 | 2 | 86 | DuPont R-700 |
| 10 | 2 | 0.5 | 87.5 | DuPont R-700 |
| 10 | 0.5 | 0.5 | 89 | DuPont R-700 |
| 2 | 0.5 | 97 | 0.5 | DuPont R-700 |

EXAMPLE 8

Titanium dioxide (89.9 g; 99.9% rutile (Aldrich Chemical)) was suspended in a solution of water (300 g) and sodium silicate (0.1 g; from 0.26 g of a 38% solution; $SiO_2/Na_2O$ ratio=3.22) and mixed with sodium chlorite (10 g; technical grade (Aldrich Chemical)) to form a suspension and immediately spray dried at an inlet temperature of 230° C. and an outlet temperature of 120° C. under reduced light conditions to form a white powder. The powder (1 g) was put into a 500 ml jar and monitored with a 0-100 ppm chlorine dioxide electrochemical sensor. Chlorine dioxide was released from the powder.

Figure 9:
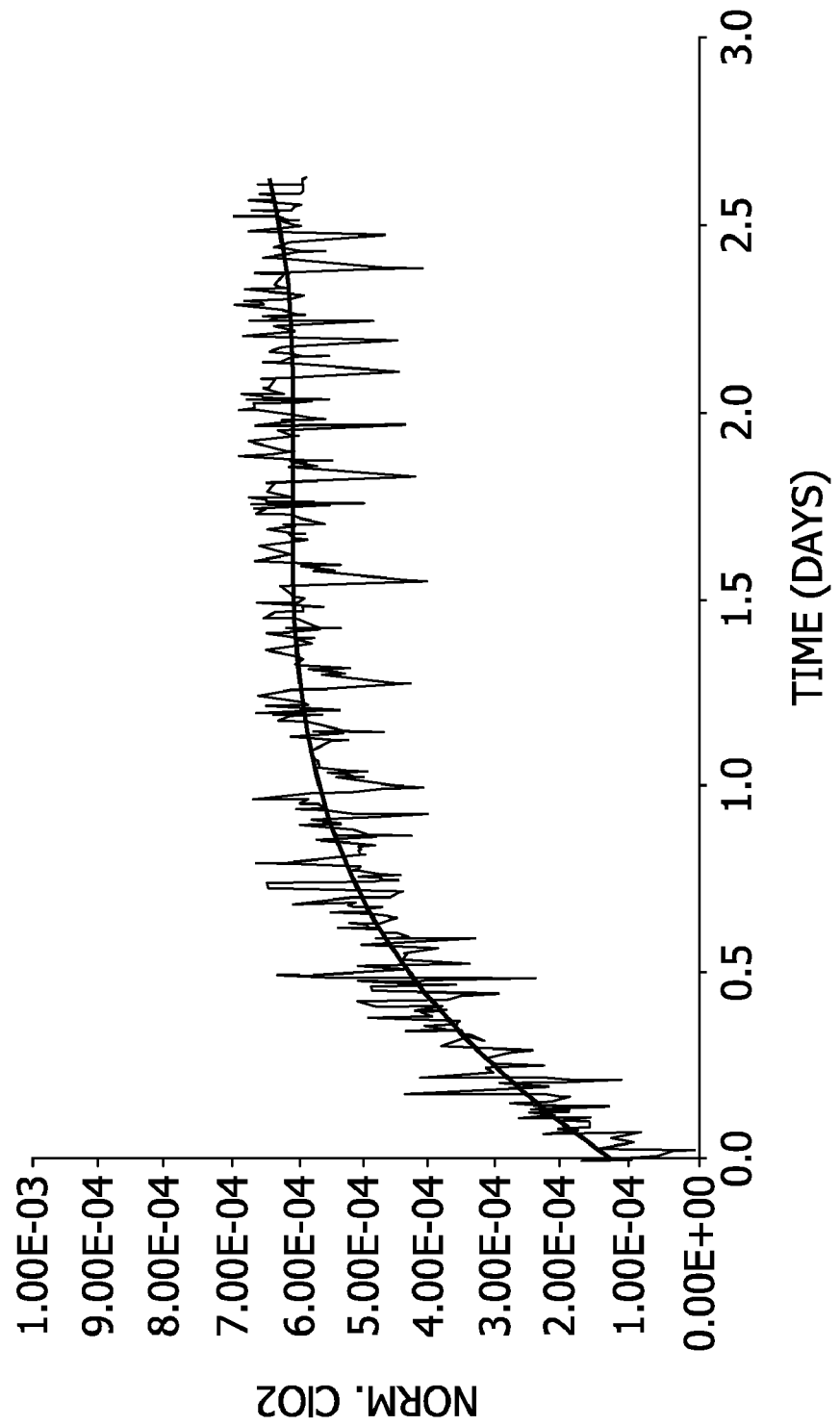

Titanium dioxide (99.9% rutile (Aldrich Chemical)) was suspended in a solution of water (300 g) and Triton X-100@ and mixed with sodium chlorite (10 g; technical grade (Aldrich Chemical)) to form a suspension and immediately spray dried as described above to form the following powders. Chlorine dioxide was released from all of the powders. The release profile for the 89 g titanium dioxide/0.5 g silicate (2.5 ratio) is shown in FIG. 9.

| Silicate (g) | $TiO_2$ (g) | $TiO_2$ Source | Triton X-100 ® (g) |
|---|---|---|---|
| 0.5 (2.5 ratio) | 87.5 | DuPont R-700 | 2 |
| 0.5 (3.2 ratio) | 89 | DuPont R-700 | 0.5 |
| 0.5 (2.5 ratio) | 89 | DuPont R-700 | 0.5 |
| 0.2 (3.2 ratio) | 89.3 | DuPont R-700 | 0.5 |
| 0.2 (2.5 ratio) | 89.3 | DuPont R-700 | 0.5 |

Figure 8:
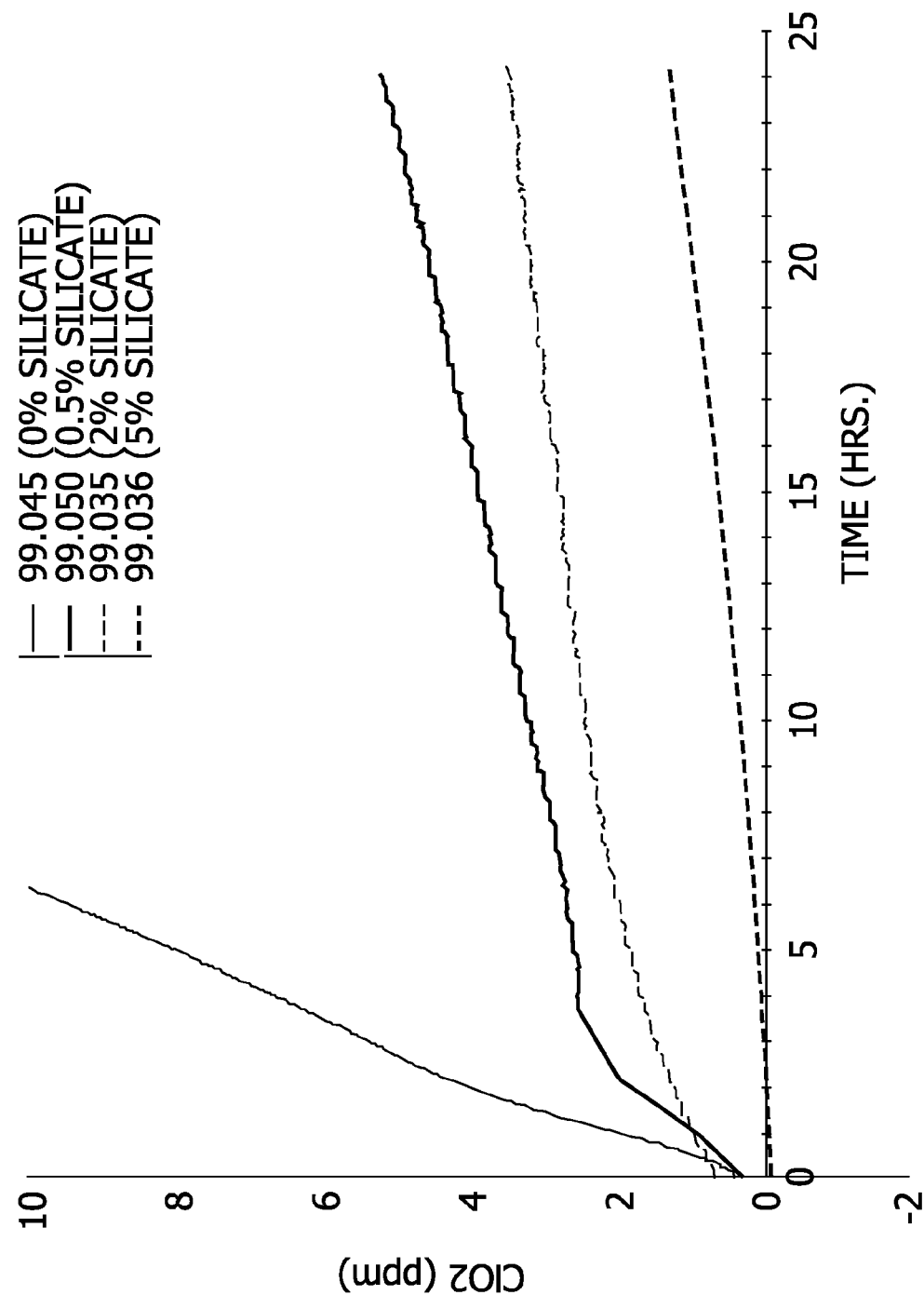

Three additional powders were prepared according to the method described above wherein the amounts of titanium dioxide and sodium silicate were 89.5 g, 88 g, and 85 g and 0.5 g, 2 g, and 5 g, respectively. In FIG. 8, the release profiles for these three powders are compared to the powder containing no silicate of FIG. 7. The chlorine dioxide release rate decreased with increasing sodium silicate content in the powders.

Additional powders were made as described above using the following proportions. Chlorine dioxide was released from all of the powders.

| $NaClO_2$ (g) | Silicate (g) | $TiO_2$ (g) | $TiO_2$ Source |
|---|---|---|---|
| 10 | 10 (3.2 ratio) | 80 | Aldrich |
| 10 | 0.5 (3.2 ratio) | 89.5 | DuPont R-700 |
| 10 | 0.5 (2.5 ratio) | 89.5 | DuPont R-700 |

EXAMPLE 9

Titanium dioxide (Aldrich Chemical) was suspended in a solution of water (300 g) and mixed with sodium chlorite (technical grade (Aldrich Chemical)) in the proportions listed below to form a suspension and immediately spray dried at an inlet temperature of 230° C. and an outlet temperature of 120° C. under reduced light conditions to form a white powder. The powder (1 g) was put into a 500 ml jar and monitored with a 0-100 ppm electrochemical sensor. Chlorine dioxide was released from the powder.

| $NaClO_2$ (g) | $TiO_2$ (g) |
|---|---|
| 50 | 50 |
| 20 | 80 |
| 10 | 90 |
| 10 | 80[1] |
| 5 | 95 |

[1]Suspension included 10 g sodium sulfate diluent

Figure 10:
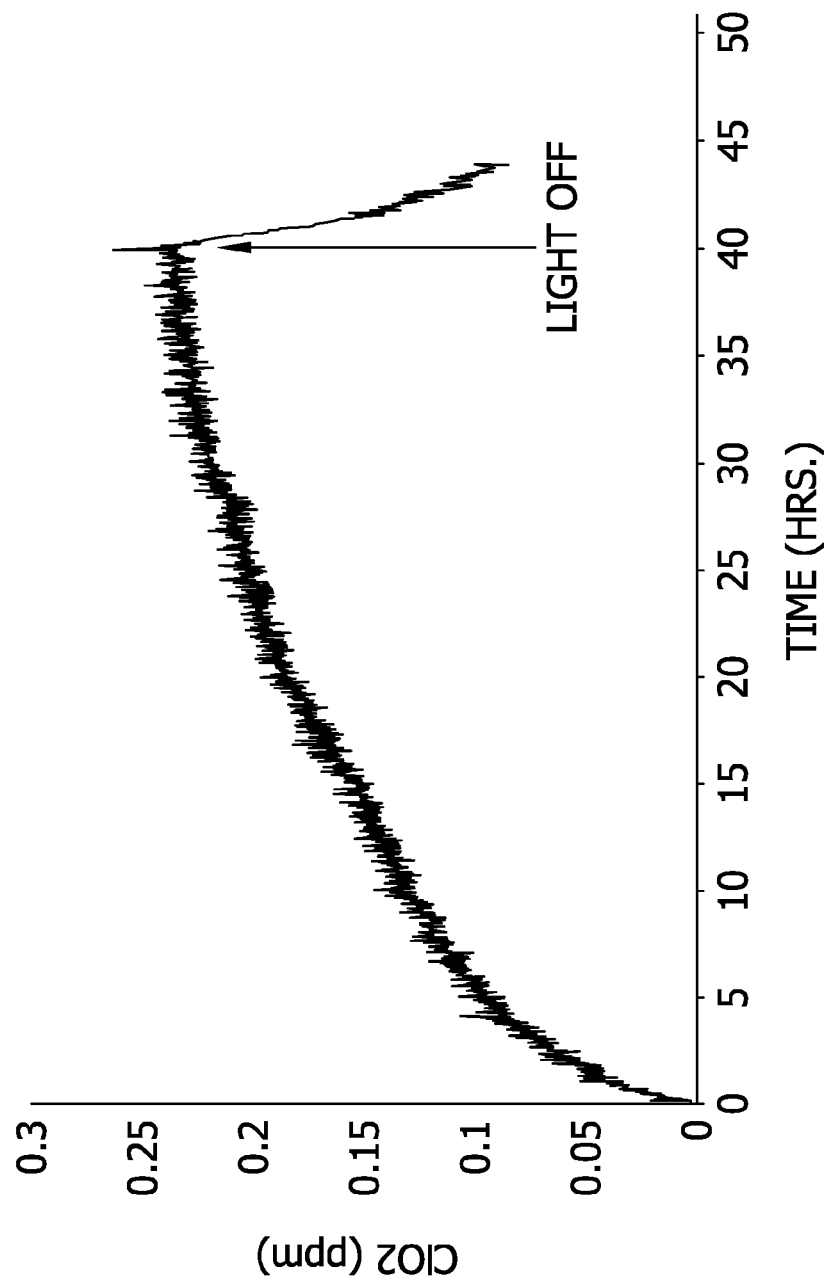

Powders were also formed as described above wherein the suspension included zinc oxide (90 g; technical grade). As shown in FIG. 10, chlorine dioxide was generated and released from the powder upon exposure to light.

Figure 11:
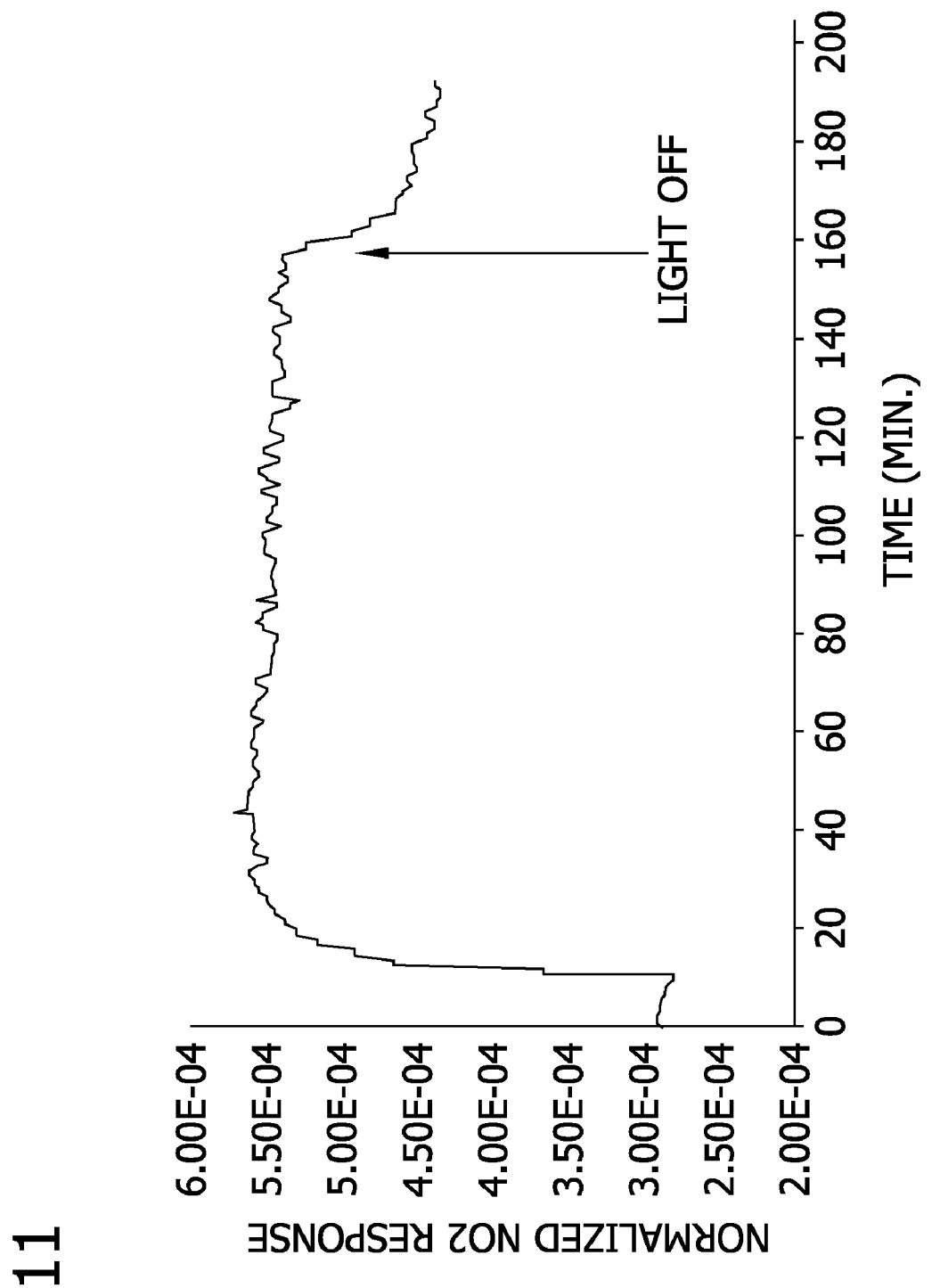

Powders were also formed as described above wherein the suspension included titanium dioxide (90 g; 99.9% rutile (Aldrich Chemical)) and 10 g of sodium carbonate (Aldrich Chemical), sodium sulfite (Aldrich Chemical) or sodium nitrite ($NaNO_2$) (technical grade (Aldrich Chemical)) to release carbon dioxide, sulfur dioxide and nitric oxide, respectively. As shown in FIG. 11, nitrogen dioxide was generated and released from the powder upon exposure to light.

EXAMPLE 10

Pellet Formation: The spray dried powder of Example 5 was compounded into pellets using 2 melt index linear low density polyethylene (LLDPE) resin (manufactured by Rexene) at a concentration of 20% powder and 80% resin. Low level incandescent lighting was used during manufacture of the pellets. The pellets were stored in aluminum foil/plastic laminate containers to protect them from exposure to light.

Film Formation: The pellets were blown into film with 2 melt index Rexene LLDPE resin (50% letdown). Thus, the resulting film contained about 10 wt. % of the powder of Example 5. Low level incandescent lighting was used during manufacture of the film. The film was stored in an aluminum foil/plastic laminate container to protect it from exposure to light.

Figure 12:
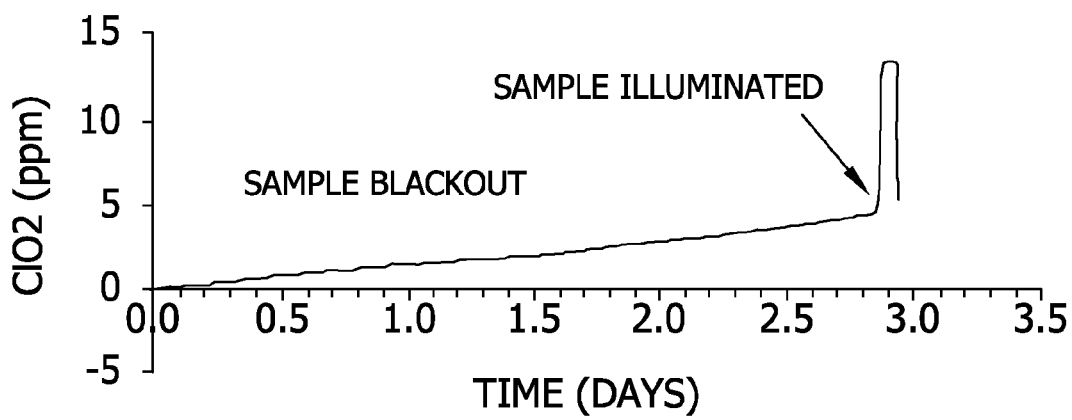
FIGS. 12-19 are plots of gas concentration as a function of time for various polymeric films incorporating gas-releasing compositions of the invention.

Photoactivation of Film under Humid Conditions: A 4.3 g film sample was placed in a 500 ml jar (including 0.5 ml saturated ammonium sulfate solution to create 80% relative humidity) with a 0-10 ppm chlorine dioxide electrochemical detector attached to the lid, and covered with aluminum foil for about 2.85 days to exclude light. No chlorine dioxide was generated during that time. Illumination of the sample with ambient fluorescent room lighting caused immediate generation of high levels of chlorine dioxide as shown in FIG. 12. The slow rise in the signal during the darkness period was an artifact of detector hydration rather than chlorine dioxide generation because the detector had previously been used for a long term under low humidity conditions.

Figure 13:
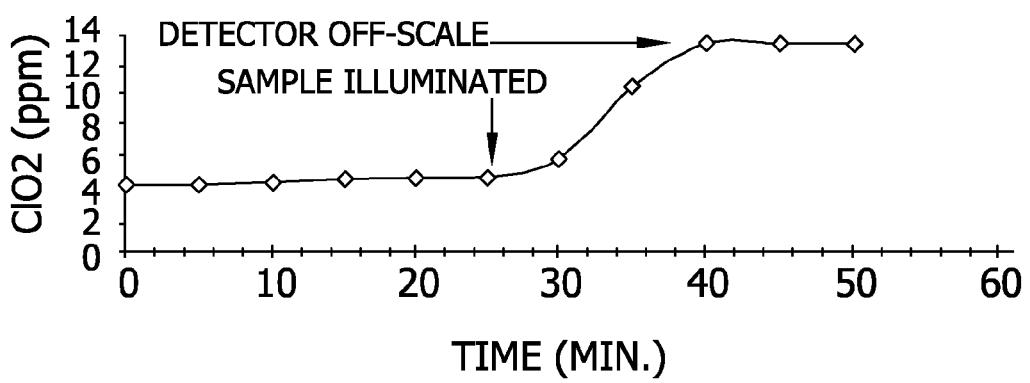

FIG. 13 illustrates the chlorine dioxide release rate at the point of illumination. Within 15 minutes of exposing the film to light, the chlorine dioxide concentration exceeded the detector limit. Within an hour, the film had released several hundred parts per million of chlorine dioxide gas.

It is noted that chlorine dioxide release was tested under minimal lighting conditions throughout this experiment. Titanium dioxide is an ultraviolet light absorber. The sample jars used throughout this experiment were soft glass, which absorbs about 95% of incident ultraviolet light. Fluorescent room lighting has some ultraviolet light, but incandescent lights provide predominantly visible light. Therefore, this experiment demonstrates suitable chlorine dioxide release under less than optimal lighting conditions.

Figure 14:
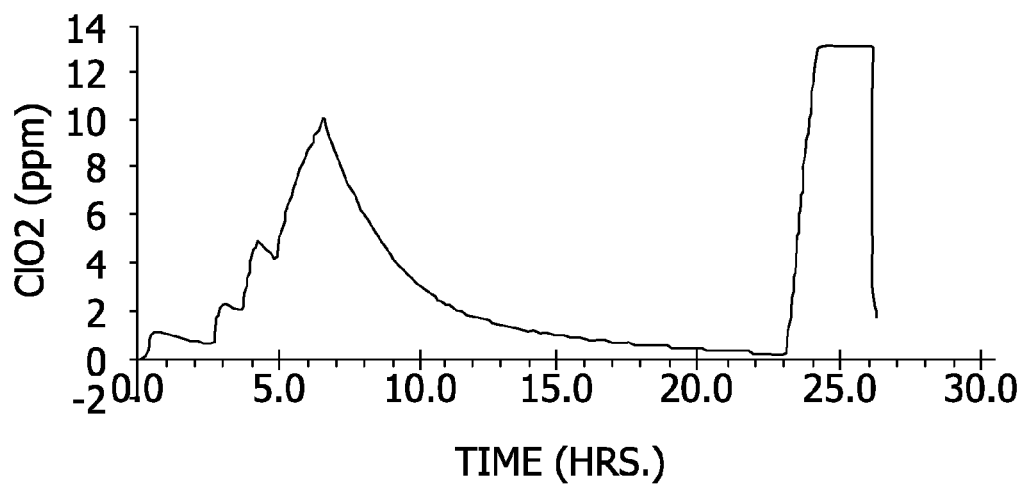

Photoactivation of Film with Light Cycling: A 1 g sample of the film was placed in a 500 ml jar with a 0-10 ppm chlorine dioxide electrochemical detector attached to the lid, and covered with aluminum foil for about 10 minutes to exclude light. No chlorine dioxide was generated during that time. Illumination of the sample from about 10 to 30 minutes with ambient fluorescent room lighting caused immediate generation of chlorine dioxide. The film was covered with foil at about 30 minutes to 2.6 hours, about 2.8 to 3.7 hours, about 4.1 to 4.9 hours, and about 6.6 to 23.2 hours during which chlorine dioxide was not generated as shown in FIG. 14. At about 2.8 to 3 hours, 3.7 to 4.1 hours, 4.9 to 6.6 hours and 23.2 to 26 hours, the film was exposed to room light and chlorine dioxide was generated. It was noted that after being exposed to a prolonged period of darkness (the 6.6 to 23.2 hour period), the film released chlorine dioxide at a higher release rate then it had initially.

Figure 15:
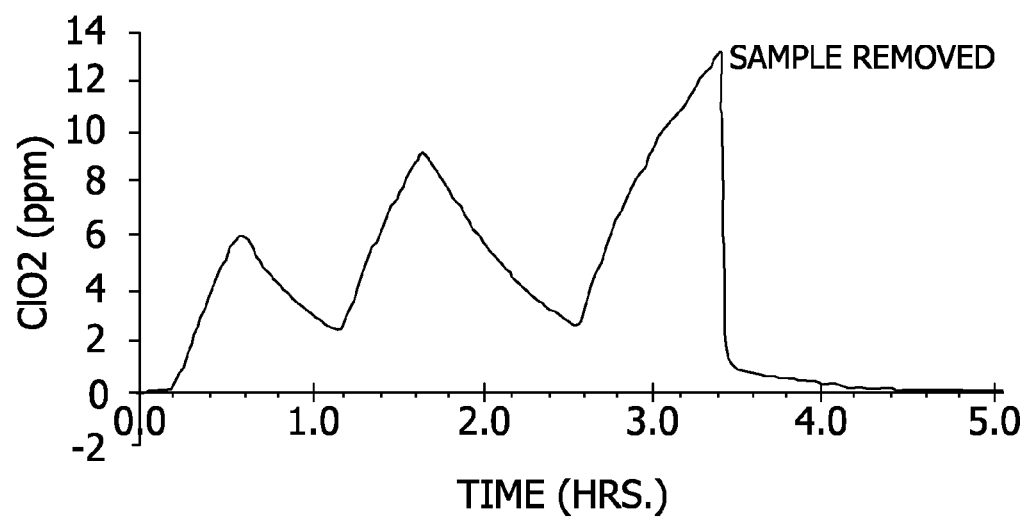

Photoactivation of Film with Light Cycling and Large Leak: A 1 g sample of the film was placed in a 500 ml jar with a 0-10 ppm chlorine dioxide electrochemical detector attached to a lid having a hole therein (about 1 cm) as a leak port, and covered with aluminum foil for about 10 minutes to exclude light. No chlorine dioxide was generated during that time. Illumination of the sample from about 10 to 31 minutes with ambient fluorescent room lighting caused immediate generation of chlorine dioxide. The film was covered with foil at about 31 minutes to 1.1 hours and about 1.7 to 2.6 hours during which chlorine dioxide was not generated as shown in FIG. 15. At about 1.1 to 1.7 hours and 2.6 to 3.4 hours, the film was exposed to room light and chlorine dioxide was generated.

Figure 16:
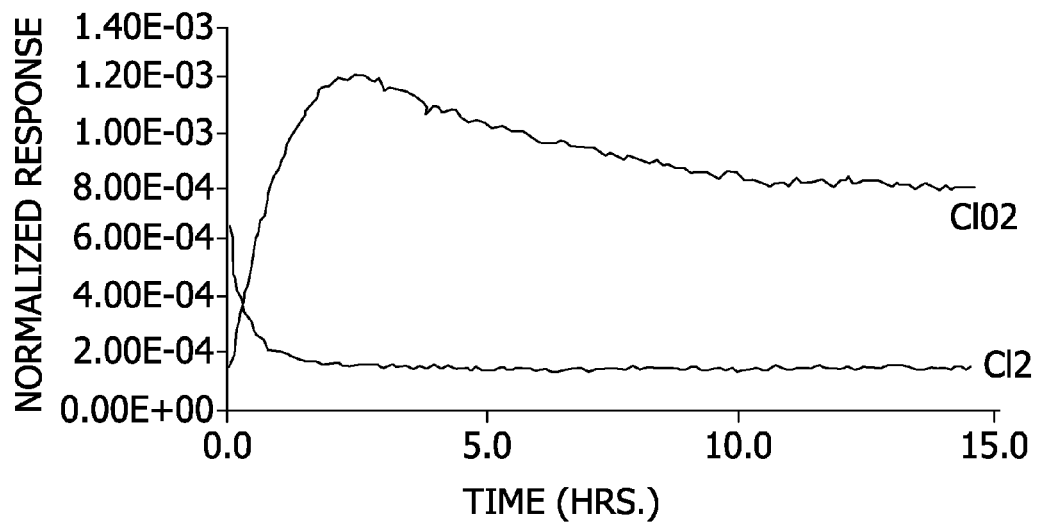

Chlorine Gas Detection: A film sample (1 g) was placed in a 500 ml jar fitted with a septum port instead of an electrochemical detector. A fused silica mass spectrometer sampling line was inserted into the jar and chlorine dioxide and chlorine gas concentrations were monitored as the sample was illuminated by a soft glow incandescent light bulb placed about one foot away from the jar. As shown in FIG. 16, very low levels of chlorine gas (at the detection limit of the mass spectrometer) were detected. Chlorine gas and ozone were generated with intense light sources causing chlorine dioxide photo-decomposition. Chlorine gas and ozone were not detected when a less intense light source, such as a soft glow incandescent light, was used.

Figure 17:
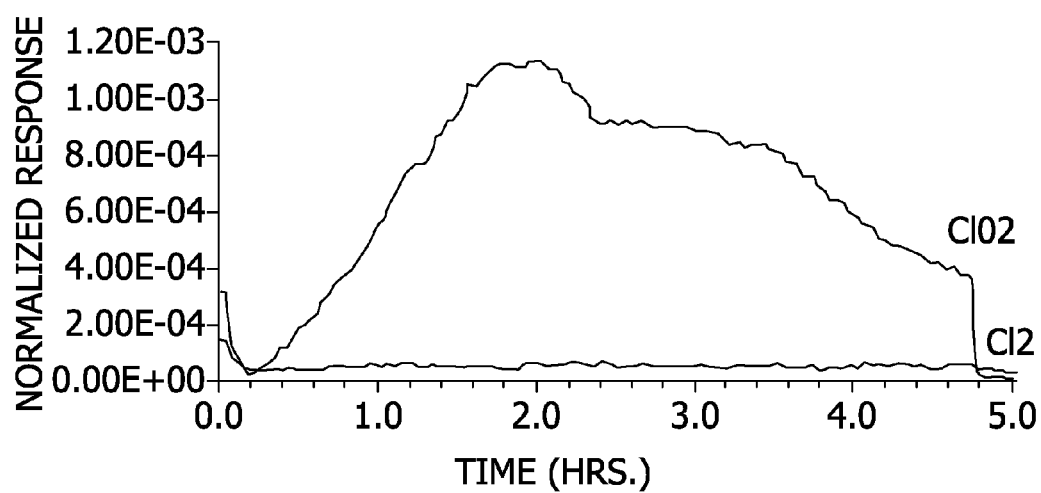

This experiment was repeated by refrigerating the sample jar at 5° C. instead of testing at room temperature to test the temperature sensitivity of the sample. Again, low levels of chlorine gas were detected (see FIG. 17). From about 2.3 to 3.3 hours, the light source was turned off as indicated by the shaded line on the figure. The film had already ceased chlorine dioxide generation, but it was observed that the rate of chlorine dioxide disappearance decreased in the dark. The sample effectively released chlorine dioxide at room temperature and when refrigerated, demonstrating the temperature insensitivity of the composition.

EXAMPLE 11

The pellets of Example 10 also were cast into film at full concentration under low incandescent light conditions to minimize premature gas generation and release. Thus, the resulting film contained about 20 wt. % of the powder of Example 5. The film was stored in an aluminum foil/plastic laminate container to protect it from exposure to light. Chlorine dioxide gas was generated in the film when it was exposed to light.

The pellets were cast into film with 2 melt index Rexene LLDPE resin (50% letdown) under low light conditions to form a film containing about 10 wt. % of the powder of Example 5. The film was stored in an aluminum foil/plastic laminate container to protect it from exposure to light. Chlorine dioxide gas was generated in the film when it was exposed to light.

The pellets also were cast at full concentration with a UV stabilizer, Tinunin™ 783 FDL (0.2 wt. % based on total weight of melt; Ciba Giegy)under low light conditions to form a film containing about 19.96% of the powder of Example 5. The film was stored in an aluminum foil/plastic laminate container to protect it from exposure to light. Chlorine dioxide gas was generated in the film when it was exposed to light.

Figure 18:
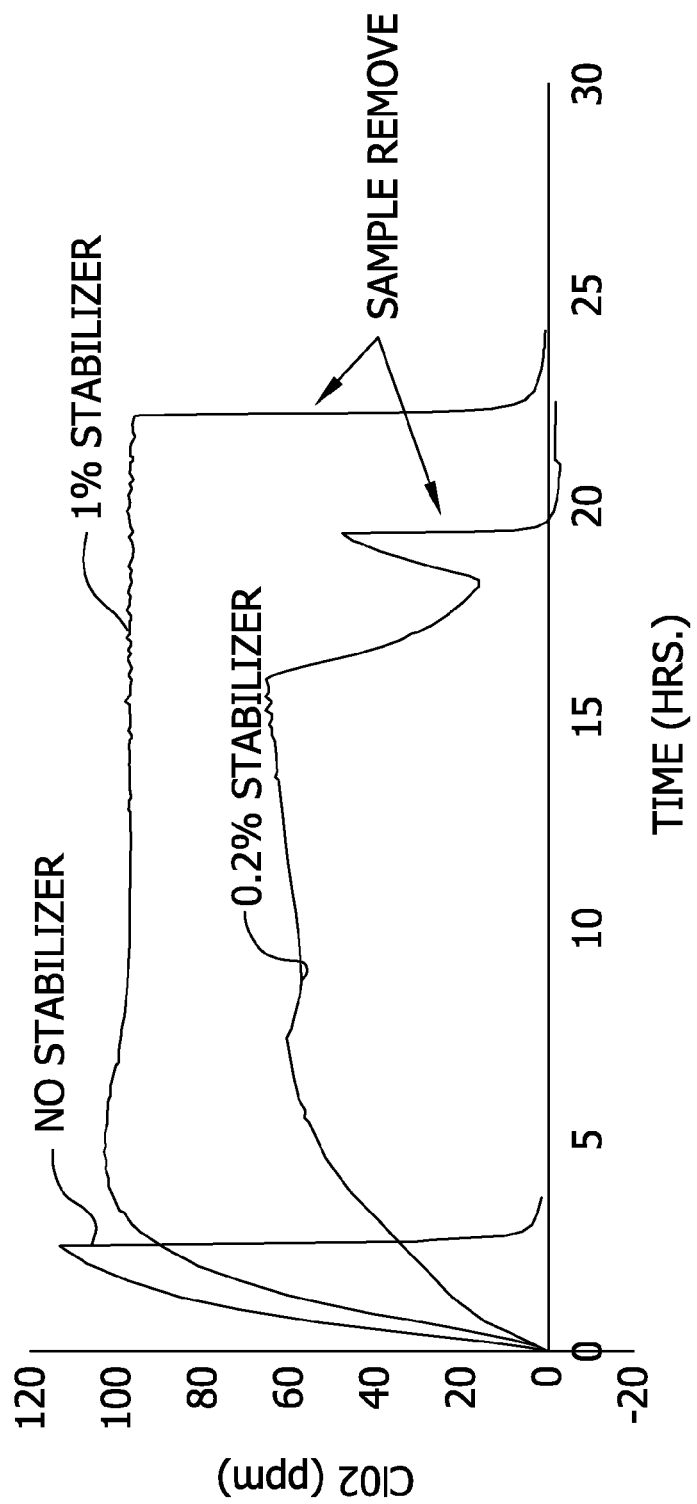

The pellets were also cast at full concentration with a UV stabilizer, Tinunin™ 783 FDL (1 wt. % based on total weight of melt; Ciba Giegy), under low light conditions to form a film containing about 19.96% of the powder of Example 5. The film was stored in an aluminum foil/plastic laminate container to protect it from exposure to light. Chlorine dioxide gas was generated in the film when it was exposed to light. FIG. 18 compares the chlorine dioxide release for the film containing no UV stabilizer with the films containing 0.2 wt. % or 1.0 wt. % UV stabilizer.

EXAMPLE 12

A suspension was prepared by dissolving poly(methylmethacrylate)(PMMA; 25 g) in methylethylketone (MEK; 75 g) and then adding the powder (25 g) of Example 5, with stirring. The resulting suspension contained 20 wt. % of the powder, 20 wt. % PMMA and 60 wt. % MEK. A small amount of the suspension was placed in a test tube and exposed to fluorescent light. An indicator strip containing potassium iodide turned purple within five minutes of the fluorescent light exposure, indicating the presence of chlorine dioxide gas. The suspension is suitable to coat finger nails or toe nails to retard, prevent, inhibit or control fungal growth.

EXAMPLE 13

Pellet Formation: Microsphère™ 2500 moisture-activated powder (available from Bernard Technologies, Inc., of Chicago, Ill.) was blended with resin (20 wt. % Microsphère™ 2500 powder, 72 wt. % low density polyethylene UC 9820, 8% linear low density polyethylene UC 1537) and pelletized. These pellets were blended with pellets of Example 10 at a 50:50 ratio. Low incandescent lighting was used during manufacture of the pellets. The pellets were stored in aluminum foil/plastic laminate containers to protect them from exposure to light.

Film Formation: The pellets were cast extruded into a film of 10 mil thickness. The resulting film included 10 wt. % of the light-activated powder and 10 wt. % of the moisture-activated powder. Low incandescent lighting was used during manufacture of the film. The film was stored in an aluminum foil/plastic laminate container to protect it from exposure to light.

Figure 19:
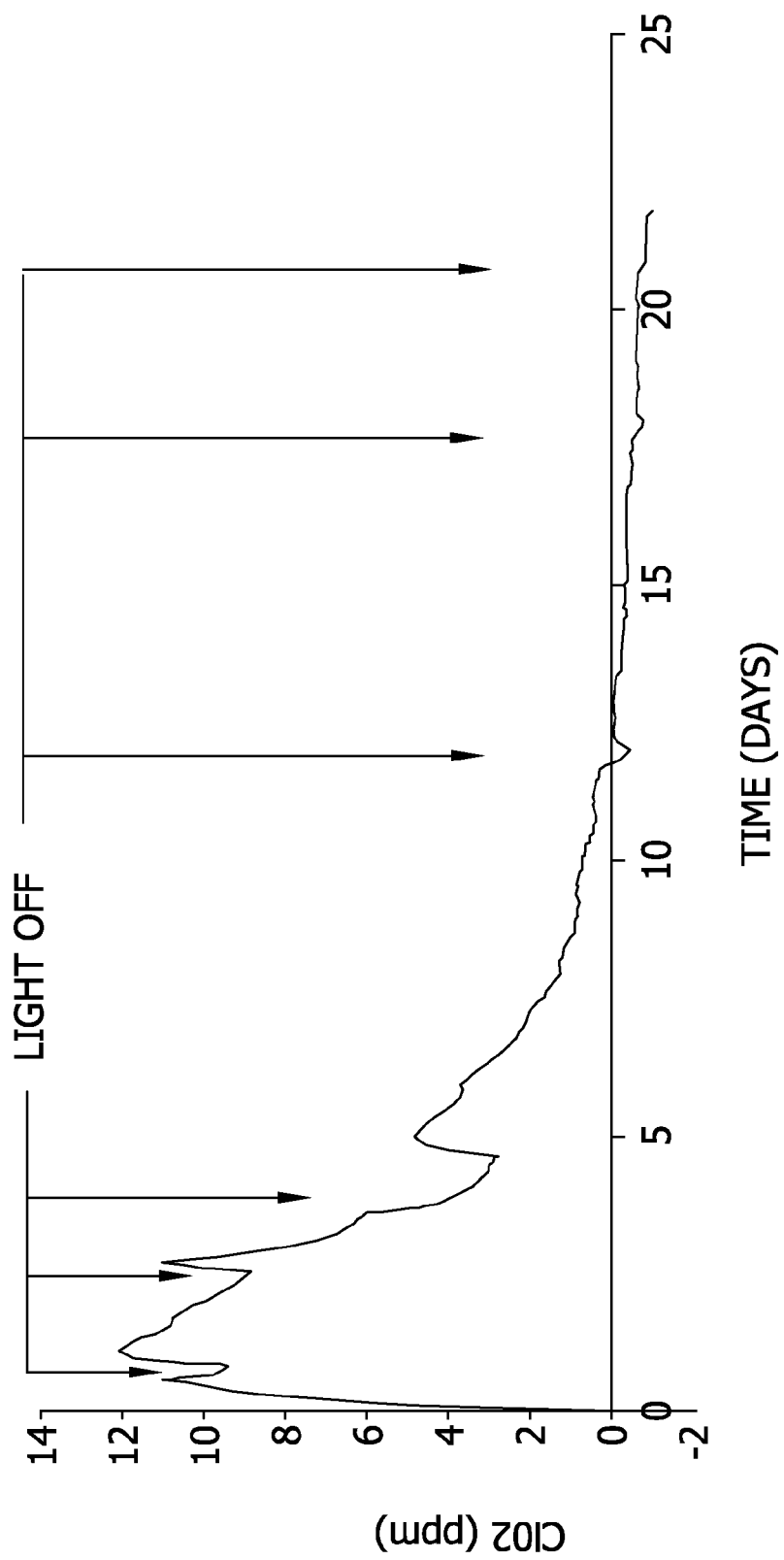

Photoactivation of Film under Humid Conditions: A 3.2 g film sample was placed in a 500 ml jar (including 0.5 ml saturated ammonium sulfate solution to create 80% relative humidity) with a 0-10 ppm chlorine dioxide electrochemical detector attached to the lid. Chlorine dioxide was released from the film within minutes. The sample was shielded from ambient fluorescent room lighting for a few minutes on five occasions as shown in FIG. 19. The generation and release of chlorine dioxide was diminished by the brief absence of light, demonstrating that the film generated and released chlorine dioxide by both light and moisture activation.

While the invention is susceptible to various modifications and alternative forms, specific embodiments thereof have been shown by way of example in the drawings and have been described herein in detail. It should be understood, however, that it is not intended to limit the invention to the particular form disclosed, but on the contrary, the intention is to cover all modifications, equivalents and alternatives falling within the spirit and scope of the invention as defined by the appended claims.

We claim:

1. A solid composition for electromagnetic energy-controlled generation and release of a gas comprising:
   between about 50 wt. % and about 99.99 wt. % of an energy-activated catalyst capable of being activated by electromagnetic energy, and
   between about 0.01 wt. % and about 50 wt. % of a solid containing anions capable of being oxidized or reacted to generate at least one gas wherein the anions are selected from the group consisting of chlorite, bisulfite, sulfite, hydrosulfide, sulfide, hypochlorite, cyanide and nitrite,
   the solid composition, when exposed to electromagnetic energy, being capable of generating and releasing the gas from the solid for at least one week after activation of the catalyst and oxidation or reaction of the anions.

2. The composition of claim 1 wherein the solid is a salt, an inert material, a polyelectrolyte, a solid electrolyte, or a solid solution.

3. The composition of claim 1 wherein the catalyst is selected from the group consisting of a metal oxide, a metal sulfide, a metal chalcogenite, a metal phosphide, a metal arsenide, a non-metallic semiconductor, a polymeric semiconductor, a photoactive homopolyanion, and a photoactive heteropolyion.

4. The composition of claim 1 wherein the metal oxide is selected from the group consisting of titanium dioxide, zinc oxide, tungsten trioxide, ruthenium dioxide, iridium dioxide, tin dioxide, strontium titanate, barium titanate, tantalum oxide, calcium titanate, iron (III) oxide, molybdenum trioxide, niobium pentoxide, indium trioxide, cadmium oxide, hafnium oxide, zirconium oxide, manganese dioxide, copper oxide, vanadium pentoxide, chromium trioxide, yttrium trioxide, silver oxide, and $Ti_xZr_{1-x}O_2$ wherein x is between 0 and 1; the metal sulfide is cadmium sulfide, zinc sulfide, indium sulfide, copper sulfide, tungsten disulfide, bismuth trisulfide, or zinc cadmium disulfide; the metal chalcogenite is zinc selenide, cadmium selenide, indium selenide, tungsten selenide, or cadmium telluride; the metal phosphide is indium phosphide; the metal arsenide is gallium arsenide; the non-metallic semiconductor is silicon, silicon carbide, diamond, germanium, germanium dioxide, or germanium telluride; the polymeric semiconductor is polyacetylene; the photoactive homopolyanion is $W_{10}O_{32}^{-4}$; and the photoactive heteropolyion is $XM_{12}O_{40}{}^{-n}$ or $X_2M_{18}O_{62}{}^{-7}$ wherein x is Bi, Si, Ge, P or As, M is Mo or W, and n is an integer from 1 to 12.

5. The composition of claim 1 wherein the gas is selected from the group consisting of chlorine dioxide, sulfur dioxide, hydrogen sulfide, chlorine, dichlorine monoxide, hydrocyanic acid, nitrogen dioxide, nitric oxide and nitrous oxide.

6. A solid composition for electromagnetic energy-controlled generation and release of a gas comprising:
   between about 50 wt. % and about 99.99 wt. % of an energy-activated catalyst capable of being activated by electromagnetic energy, and
   between about 0.01 wt. % and about 50 wt. % of a solid containing anions capable of being oxidized or reacted to generate at least one gas selected from the group consisting of chlorine dioxide, sulfur dioxide, hydrogen sulfide, dichlorine monoxide, hydrocyanic acid, nitrogen dioxide, nitric oxide and nitrous oxide,
   the solid composition, when exposed to electromagnetic energy, being capable of generating and releasing the gas from the solid for at least one week after activation of the catalyst and oxidation or reaction of the anions.

7. The composition of claim 6 wherein the catalyst is selected from the group consisting of a metal oxide, a metal sulfide, a metal chalcogenite, a metal phosphide, a metal arsenide, a non-metallic semiconductor, a polymeric semiconductor, a photoactive homopolyanion, and a photoactive heteropolyion.

8. The composition of claim 6 wherein the metal oxide is selected from the group consisting of titanium dioxide, zinc oxide, tungsten trioxide, ruthenium dioxide, iridium dioxide, tin dioxide, strontium titanate, barium titanate, tantalum oxide, calcium titanate, iron (III) oxide, molybdenum trioxide, niobium pentoxide, indium trioxide, cadmium oxide, hafnium oxide, zirconium oxide, manganese dioxide, copper oxide, vanadium pentoxide, chromium trioxide, yttrium trioxide, silver oxide, and $Ti_xZr_{1-x}O_2$ wherein x is between 0 and 1; the metal sulfide is cadmium sulfide, zinc sulfide, indium sulfide, copper sulfide, tungsten disulfide, bismuth trisulfide, or zinc cadmium disulfide; the metal chalcogenite is zinc selenide, cadmium selenide, indium selenide, tungsten selenide, or cadmium telluride; the metal phosphide is indium phosphide; the metal arsenide is gallium arsenide; the non-metallic semiconductor is silicon, silicon carbide, diamond, germanium, germanium dioxide, or germanium telluride; the polymeric semiconductor is polyacetylene; the photoactive homopolyanion is $W_{10}O_{32}{}^{-4}$; and the photoactive heteropolyion is $XM_{12}O_{40}{}^{-n}$ or $X_2M_{18}O_{62}{}^{-7}$ wherein x is Bi, Si, Ge, P or As, M is Mo or W, and n is an integer from 1 to 12.

9. A solid composition for electromagnetic energy-controlled generation and release of at least one gas comprising:
   between about 50 wt. % and about 99.99 wt. % of an energy-activated catalyst capable of being activated by electromagnetic energy, and
   between about 0.01 wt. % and about 50 wt. % of a solid containing chlorite or nitrite anions;
   the solid composition, when exposed to electromagnetic energy, being capable of generating and releasing chlorine dioxide or a nitrogen oxide from the solid for at least one week after activation of the catalyst and oxidation or reaction of the anions.

10. A solid composition for photo-controlled generation and release of at least one gas comprising:
    between about 50 wt. % and about 99.99 wt. % of a photocatalyst capable of being activated by light, and
    between about 0.01 wt. % and about 50 wt. % of a solid containing anions capable of photo-oxidizing or reacting to generate at least one gas wherein the anions are selected from the group consisting of chlorite, bisulfite, sulfite, hydrosulfide, sulfide, hypochlorite, cyanide and nitrite,
    the solid composition, when exposed to light, being capable of generating and releasing the gas from the solid for at least one week after activation of the photocatalyst and photo-oxidation or reaction of the anions.

11. The composition of claim 10 wherein the solid is a salt, an inert material, a polyelectrolyte, a solid electrolyte, or a solid solution.

12. The composition of claim 10 wherein the photocatalyst is selected from the group consisting of a metal oxide, a metal sulfide, a metal chalcogenite, a metal phosphide, a metal arsenide, a non-metallic semiconductor, a polymeric semiconductor, a photoactive homopolyanion, and a photoactive heteropolyion.

13. The composition of claim 12 wherein the metal oxide is selected from the group consisting of titanium dioxide, zinc oxide, tungsten trioxide, ruthenium dioxide, iridium dioxide, tin dioxide, strontium titanate, barium titanate, tantalum oxide, calcium titanate, iron (III) oxide, molybdenum trioxide, niobium pentoxide, indium trioxide, cadmium oxide, hafnium oxide, zirconium oxide, manganese dioxide, copper oxide, vanadium pentoxide, chromium trioxide, yttrium trioxide, silver oxide, and $Ti_xZr_{1-x}O_2$ wherein x is between 0 and 1; the metal sulfide is cadmium sulfide, zinc sulfide, indium sulfide, copper sulfide, tungsten disulfide, bismuth trisulfide, or zinc cadmium disulfide; the metal chalcogenite is zinc selenide, cadmium selenide, indium selenide, tungsten selenide, or cadmium telluride; the metal phosphide is indium phosphide; the metal arsenide is gallium arsenide; the non-metallic semiconductor is silicon, silicon carbide, diamond, germanium, germanium dioxide, or germanium telluride; the polymeric semiconductor is polyacetylene; the photoactive homopolyanion is $W_{10}O_{32}{}^{-4}$; and the photoactive heteropolyion is $XM_{12}O_{40}{}^{-n}$ or $X_2M_{18}O_{62}{}^{-7}$ wherein x is Bi, Si, Ge, P or As, M is Mo or W, and n is an integer from 1 to 12.

14. The composition of claim 10 wherein the gas is selected from the group consisting of chlorine dioxide, sulfur dioxide, hydrogen sulfide, chlorine, dichlorine monoxide, hydrocyanic acid, nitrogen dioxide, nitric oxide and nitrous oxide.

15. The composition of claim 10 wherein the light is ultraviolet light or visible light.

16. A solid composition for photo-controlled generation and release of at least one gas comprising:
    between about 50 wt. % and about 99.99 wt. % of a photocatalyst capable of being activated by light, and
    between about 0.01 wt. % and about 50 wt. % of a solid containing anions capable of photo-oxidizing or reacting to generate at least one gas selected from the group consisting of chlorine dioxide, sulfur dioxide, hydrogen sulfide, dichlorine monoxide, hydrocyanic acid, nitrogen dioxide, nitric oxide and nitrous oxide, the solid composition, when exposed to light, being capable of generating and releasing the gas from the solid for at least one week after activation of the photocatalyst and photo-oxidation or reaction of the anions.

17. The composition of claim 16 wherein the photocatalyst is selected from the group consisting of a metal oxide, a metal sulfide, a metal chalcogenite, a metal phosphide, a metal arsenide, a non-metallic semiconductor, a polymeric semiconductor, a photoactive homopolyanion, and a photoactive heteropolyion.

18. The composition of claim 17 wherein the metal oxide is selected from the group consisting of titanium dioxide, zinc oxide, tungsten trioxide, ruthenium dioxide, iridium dioxide, tin dioxide, strontium titanate, barium titanate, tantalum oxide, calcium titanate, iron (III) oxide, molybdenum trioxide, niobium pentoxide, indium trioxide, cadmium oxide, hafnium oxide, zirconium oxide, manganese dioxide, copper oxide, vanadium pentoxide, chromium trioxide, yttrium trioxide, silver oxide, and $Ti_xZr_{1-x}O_2$ wherein x is between 0 and 1; the metal sulfide is cadmium sulfide, zinc sulfide, indium sulfide, copper sulfide, tungsten disulfide, bismuth trisulfide, or zinc cadmium disulfide; the metal chalcogenite is zinc selenide, cadmium selenide, indium selenide, tungsten selenide, or cadmium telluride; the metal phosphide is indium phosphide; the metal arsenide is gallium arsenide; the non-metallic semiconductor is silicon, silicon carbide, diamond, germanium, germanium dioxide, or germanium telluride; the polymeric semiconductor is polyacetylene; the photoactive homopolyanion is $W_{10}O_{32}^{-4}$; and the photoactive heteropolyion is $XM_{12}O_{40}^{-n}$ or $X_2M_{18}O_{62}^{-7}$ wherein x is Bi, Si, Ge, P or As, M is Mo or W, and n is an integer from 1 to 12.

19. The composition of claim 16 wherein the light is ultraviolet light or visible light.

20. A solid composition for photo-controlled generation and release of at least one gas comprising:
between about 50 wt. % and about 99.99 wt. % of a photocatalyst capable of being activated by light, and
between about 0.01 wt. % and about 50 wt. % of a solid containing chlorite or nitrite anions,
the solid composition, when exposed to light, being capable of generating and releasing chlorine dioxide or a nitrogen oxide from the solid for at least one week after activation of the photocatalyst and photo-oxidation or reaction of the anions.

* * * * *

UNITED STATES PATENT AND TRADEMARK OFFICE
CERTIFICATE OF CORRECTION

PATENT NO. : 7,273,567 B1  
APPLICATION NO. : 09/448927  
DATED : September 25, 2007  
INVENTOR(S) : Wellinghoff et al.

Page 1 of 1

It is certified that error appears in the above-identified patent and that said Letters Patent is hereby corrected as shown below:

On the title page item 73, Assignee: "MicroActive Corp., Reno, NV (US)" should read -- MicroActive Corp., Reno, NV (US) and Southwest Research Institute, San Antonio, TX (US) --.

Signed and Sealed this

Twenty-fourth Day of March, 2009

JOHN DOLL  
*Acting Director of the United States Patent and Trademark Office*